(12) United States Patent
Yoshimura et al.

(10) Patent No.: US 10,859,139 B2
(45) Date of Patent: Dec. 8, 2020

(54) VEHICLE TRANSMISSION

(71) Applicants: Toyota Jidosha Kabushiki Kaisha, Toyota (JP); Toyota Motorsport GmbH, Cologne (DE)

(72) Inventors: Tomohiro Yoshimura, Toyota (JP); Shinichi Takeuchi, Nisshin (JP); Akihiko Ichikawa, Toyota (JP); Jun Yabuta, Nagoya (JP); Klemens Pollmeier, Frechen (DE); Lars Van Leeuwen, Baarlo (NL); Andree Miller, Frechen (DE); Patrizio Agostinelli, Viersen (DE)

(73) Assignees: Toyota Jidosha Kabushiki Kaisha, Toyota (JP); Toyota Motorsport GmbH, Cologne (DE)

( * ) Notice: Subject to any disclaimer, the term of this patent is extended or adjusted under 35 U.S.C. 154(b) by 499 days.

(21) Appl. No.: 15/705,380

(22) Filed: Sep. 15, 2017

(65) Prior Publication Data
US 2018/0073599 A1  Mar. 15, 2018

(30) Foreign Application Priority Data
Sep. 15, 2016 (JP) .................. 2016-180997

(51) Int. Cl.
*F16H 3/097* (2006.01)
*F16H 3/00* (2006.01)
(Continued)

(52) U.S. Cl.
CPC ............ *F16H 3/097* (2013.01); *F16D 11/14* (2013.01); *F16D 21/04* (2013.01); *F16D 23/02* (2013.01);
(Continued)

(58) Field of Classification Search
CPC .. F16H 3/006; F16H 3/097; F16H 2003/0811; F16H 2003/0933; F16H 2003/0931; F16H 61/688
(Continued)

(56) References Cited

U.S. PATENT DOCUMENTS 7,165,470 B2 * 1/2007 Sakamoto .............. B60K 6/365
74/339
7,226,379 B2 * 6/2007 Ibamoto .................. B60K 6/36
475/221

(Continued)

FOREIGN PATENT DOCUMENTS

CN 101189449 A 5/2008
DE 10 2015 120 273 A1 1/2017
(Continued)

*Primary Examiner* — William C Joyce
(74) *Attorney, Agent, or Firm* — Oblon, McClelland, Maier & Neustadt, L.L.P.

(57) ABSTRACT

A vehicle transmission has a plurality of gear positions that are to be selectively established, and includes: an input shaft; a first shaft; a second shaft; an output shaft; at least one first drive gear disposed on the first shaft; at least one second drive gear disposed on the second shaft; at least one driven gear disposed on the output shaft; a dog clutch connecting and disconnecting between the input shaft and each of the first and second shafts; and a synchronous meshing apparatus. The synchronous meshing apparatus connects and disconnects between each of the first and second shafts and the output shaft, and, when connecting between each of the first and second shafts and the output shaft, establishes a power transmission path from each of the first and second shafts to the output shaft via a selected one of the at least one first or second drive gear.

14 Claims, 5 Drawing Sheets

(51) Int. Cl.
*F16H 61/688* (2006.01)
*F16D 11/14* (2006.01)
*F16D 21/04* (2006.01)
*F16D 23/02* (2006.01)
*F16H 63/30* (2006.01)
*F16H 3/093* (2006.01)
*F16H 3/08* (2006.01)

(52) U.S. Cl.
CPC ........... *F16H 3/006* (2013.01); *F16H 61/688* (2013.01); *F16H 63/30* (2013.01); *F16H 2003/0811* (2013.01); *F16H 2003/0931* (2013.01); *F16H 2063/3093* (2013.01); *F16H 2200/006* (2013.01); *F16H 2200/0052* (2013.01)

(58) Field of Classification Search
USPC .......................................................... 74/331
See application file for complete search history.

(56) References Cited

U.S. PATENT DOCUMENTS

| | | | | |
|---|---|---|---|---|
| 2005/0120817 A1* | 6/2005 | Sakamoto | ............. | B60K 6/365 |
| | | | | 74/335 |
| 2008/0090691 A1* | 4/2008 | Van Druten | ............ | F16H 3/095 |
| | | | | 475/207 |
| 2016/0053860 A1 | 2/2016 | Arima | | |
| 2017/0002898 A1 | 1/2017 | Eo et al. | | |

FOREIGN PATENT DOCUMENTS

| | | | |
|---|---|---|---|
| EP | 2 829 773 | | 1/2015 |
| GB | 2464572 | * | 4/2010 |
| JP | 2004-156646 | * | 6/2004 |
| JP | 2008-534387 A | | 8/2008 |
| JP | 2014-211219 A | | 11/2014 |
| JP | 2015-10670 | | 1/2015 |
| JP | 2016-41970 A | | 3/2016 |

* cited by examiner

FIG.4

| GEAR POSITION | SYNCHRO-LESS DOG CLUTCH | | MULTI-STAGE GEAR BOX | | | | | | | | |
|---|---|---|---|---|---|---|---|---|---|---|---|
| | Odd | Even | 1 | 3 | 5 | 7 | R | 2 | 4 | 6 | 8 |
| N | O | | | | | | | | | | |
| R | | O | | | | | O | | | | |
| 1 | O | | O | | | | | | △ | | |
| 2 | | O | △ | | | | | O | | | |
|   | | O | | △ | | | | O | | | |
| 3 | O | | | O | | | | | △ | | |
|   | O | | | O | | | | | | △ | |
| 4 | | O | | △ | | | | | O | | |
|   | | O | | | △ | | | | O | | |
| 5 | O | | | | O | | | | △ | | |
|   | O | | | | O | | | | | △ | |
| 6 | | O | | | △ | | | | | O | |
|   | | O | | | | △ | | | | O | |
| 7 | O | | | | | O | | | | △ | |
|   | O | | | | | O | | | | | △ |
| 8 | | O | | | | △ | | | | | O |

O: WITH TORQUE TRANSMISSION
△: WITHOUT TORQUE TRANSMISSION

VEHICLE TRANSMISSION

INCORPORATION BY REFERENCE

This application claims priority from Japanese Patent Application No. 2016-180997 filed on Sep. 15, 2016, the disclosure of which is herein incorporated by reference in its entirety.

BACKGROUND OF THE INVENTION

Field of the Invention

The present invention relates to constructions of a vehicle transmission including a dog clutch.

Discussion of Related Art

There is known a vehicle transmission including a dog clutch that is to be selectively engaged and disengaged for selectively establishing a plurality of gear positions. An example of such a transmission is disclosed in Patent Document 1. In the transmission disclosed in Patent Document 1, first through fifth drive gears 41-45 are disposed on an input shaft 31 while first through fifth driven gears 51-55 are disposed on an output shaft 32. A first selector 61 (dog clutch) is provided between the first driven gear 51 and the second driven gear 52, for selectively connecting and disconnecting between the first driven gear 51 and the output shaft 32 and between the second driven gear 52 and the output shaft 32. A second selector 62 (dog clutch) is provided between the third drive gear 43 and the fourth drive gear 44, for selectively connecting and disconnecting the third drive gear 43 and the input shaft 31 and between the fourth drive gear 44 and the input shaft 31. A third selector 63 is provided in a position adjacent to the fifth drive gear 45, for selectively connecting and disconnecting between the fifth drive gear 45 and the input shaft 31.

PRIOR ART DOCUMENT

Patent Document

[Patent Document 1] JP 2015-10670 A

SUMMARY OF THE INVENTION

In a vehicle transmission like that disclosed in Patent Document 1, when a dog clutch including dog teeth is to be engaged upon gear shifting, ones of the dog teeth are brought into meshing engagement with the others of the dog teeth that are opposed to the ones of the dog teeth. In this instance, if the dog teeth opposed to each other are moved toward each other so as to mesh with each other while being in the same phase, the opposed dog teeth collide with each other, namely, a so-called "teeth collision" occurs. The teeth collision of the dog teeth is avoided by an arrangement with sensors that are configured to detect circumferential positions of the dog teeth so that the meshing engagement is performed with the dog teeth being in predetermined circumferential positions. However, the arrangement requires the sensors to be provided for each dog clutch, thereby possibly resulting in an increased number of components.

The present invention was made in view of the background discussed above. It is therefore an object of the present invention to provide, in a vehicle transmission including a dog clutch, a construction which enables the transmission to have a multiplicity of gear positions and which restrains increase of the number of components such as sensors. This object of the invention may be achieved by any one of first through eighth aspects of the invention which are described below.

The first aspect of this invention provides: a vehicle transmission having a plurality of gear positions that are to be selectively established, the vehicle transmission comprising: (i) an input shaft to which a power is to be transmitted from an engine; (ii) a plurality of intermediate shafts including a first shaft and a second shaft such that the power is to be transmitted from the input shaft to a selected one of the first and second shafts; (iii) an output shaft to which the power is to be transmitted from the input shaft via the selected one of the first and second shafts; (iv) at least one first drive gear which is disposed on the first shaft; (v) at least one second drive gear which is disposed on the second shaft; (vi) at least one driven gear which is disposed on the output shaft; (vii) a dog clutch which is disposed on the input shaft, and which is configured to selectively connect and disconnect between the input shaft and the first shaft and selectively connect and disconnect between the input shaft and the second shaft; and (viii) a synchronous meshing apparatus including: a first synchronous meshing device and a second synchronous meshing device, wherein the first synchronous meshing device is configured to selectively connect and disconnect between the first shaft and the output shaft, and is configured, when connecting between the first shaft and the output shaft, to establish a power transmission path from the first shaft to the output shaft via a selected one of the at least one first drive gear and a corresponding one of the at least one driven gear which meshes with the selected one of the at least one first drive gear, and the second synchronous meshing device is configured to selectively connect and disconnect between the second shaft and the output shaft, and is configured, when connecting between the second shaft and the output shaft, to establish a power transmission path from the second shaft to the output shaft via a selected one of the at least one second drive gear and a corresponding one of the at least one driven gear which meshes with the selected one of the at least one second drive gear.

According to the second aspect of the invention, in the vehicle transmission defined in the first aspect of the invention, the vehicle comprises: a first input gear and a second input gear which are disposed on the input shaft and which are rotatable relative to the input shaft; and a first output gear and a second output gear which are fixed on the first shaft and the second shaft, respectively, and which mesh with the first input gear and the second input gear, respectively, wherein the dog clutch is configured to selectively connect and disconnect between the input shaft and the first input gear and selectively connect and disconnect between the input shaft and the second input gear.

According to the third aspect of the invention, in the vehicle transmission defined in the first or second aspect of the invention, the first shaft, the second shaft and the output shaft extend along respective axes different from one another, the at least one first drive gear disposed on the first shaft, the at least second drive gear and the at least one driven gear disposed on the output shaft overlap with one another as viewed in a radial direction of the output shaft, and the plurality of driven gears disposed on the output shaft mesh with the at least one first drive gear disposed on the first shaft and the at least second drive gear disposed on the second shaft.

According to the fourth aspect of the invention, in the vehicle transmission defined in the first or second aspect of the invention, the first shaft and the second shaft are coaxial with each other, and overlap with each other as viewed in a radial direction of the output shaft, the output shaft extends along an axis that is different from an axis of the first shaft and the second shaft, the at least one first drive gear disposed on the first shaft and the at least one second drive gear disposed on the second shaft are located in respective positions different from each other in a direction of the axis of the first and second shafts, and the at least one driven gear disposed on the output shaft consists of at least one first driven gear meshing with the at least one first drive gear and at least one second driven gear meshing with the at least one second drive gear.

According to the fifth aspect of the invention, in the vehicle transmission defined in any one of the second through fourth aspects of the invention, the dog clutch includes: a first dog ring disposed to be adjacent to the first input gear in an axial direction of the input shaft; a second dog ring disposed to be adjacent to the second input gear in the axial direction of the input shaft; dog teeth provided in the first input gear; and dog teeth provided in the second input gear, the first dog ring is provided with dog teeth that are to mesh with the dog teeth of the first input gear, the second dog ring is provided with dog teeth that are to mesh with the dog teeth of the second input gear, and the first dog ring and the second dog ring are unrotatable relative to the input shaft, and are movable relative to the input shaft in the axial direction of the input shaft.

According to the sixth aspect of the invention, in the vehicle transmission defined in the fifth aspect of the invention, each of the first and second dog rings of the dog clutch includes a first annular member and a second annular member that are connected to each other via an elastic member, the first annular member of the first dog ring is disposed to be adjacent to the first input gear in the axial direction of the input shaft, while the second annular member of the first dog ring is disposed on a side of said first annular member of said first dog ring, which is remote from said first input gear, in the axial direction of said input shaft, the dog teeth of the first dog ring include first dog teeth which are provided in the first annular member of the first dog ring, and which are to mesh with the dog teeth of the first input gear; the dog teeth of the first dog ring include, in addition to the first dog teeth, second dog teeth which are provided in the second annular member of the first dog ring, and which extend through respective through-holes provided in the first annular member of the first dog ring so as to mesh with the dog teeth of the first input gear; the first annular member of the second dog ring is disposed to be adjacent to the second input gear in the axial direction of the input shaft, while the second annular member of the second dog ring is disposed on a side of the first annular member of the second dog ring, which is remote from the second input gear, in the axial direction of the input shaft, the dog teeth of the second dog ring include first dog teeth which are provided in the first annular member of the second dog ring, and which are to mesh with the dog teeth of the second input gear; and the dog teeth of the second dog ring include, in addition to the first dog teeth, second dog teeth which are provided in the second annular member of the second dog ring, and which extend through respective through-holes provided in the first annular member of the second dog ring so as to mesh with the dog teeth of the second input gear.

According to the seventh aspect of the invention, in the vehicle transmission defined in any one of the second through fourth aspects of the invention, the dog clutch includes: a dog ring disposed between the first input gear and the second input gear in an axial direction of the input shaft; dog teeth provided in the first input gear; and dog teeth provided in the second input gear, the dog ring is provided, on a first-side face thereof opposed to the first input gear in the axial direction of the input shaft, with dog teeth that are to mesh with the dog teeth of the first input gear, the dog ring is provided, on a second-side face thereof opposed to the second input gear in the axial direction of the input shaft, with dog teeth that are to mesh with the dog teeth of the second input gear, and the dog ring is unrotatable relative to the input shaft, and is movable relative to the input shaft in the axial direction of the input shaft.

According to the eighth aspect of the invention, in the vehicle transmission defined in the seventh aspect of the invention, the dog ring includes a first annular member and a second annular member that are connected to each other via an elastic member, the first annular member is disposed on a side of the first input gear in the axial direction of the input shaft, while the second annular member is disposed on a side of the second input gear in the axial direction of the input shaft, the dog teeth provided on the first-side face of the dog ring include: first dog teeth which are provided on the first annular member; and fourth dog teeth which are provided on the second annular member, the dog teeth provided on the second-side face of the dog ring include: second dog teeth which are provided on the first annular member; and third dog teeth which are provided on the second annular member, the second dog teeth extend through respective through-holes provided in the second annular member so as to mesh with the dog teeth of the second input gear, and the fourth dog teeth extend through respective through-holes provided in the first annular member so as to mesh with the dog teeth of the first input gear.

Another object of the present invention is to provide, in a dog clutch that is used in a vehicle transmission including (i) an input shaft to which a power is to be transmitted from an engine, (ii) a plurality of intermediate shafts including a first shaft and a second shaft such that the power is to be transmitted from the input shaft to a selected one of the first and second shafts, and (iii) an output shaft to which the power is to be transmitted from the input shaft via the selected one of the first and second shafts, a construction which restrains increase of the number of components. This object of the invention may be achieved by a ninth aspect of the invention, which provides a dog clutch which is to be disposed on the input shaft, and which is configured to selectively connect and disconnect between the input shaft and the first shaft and selectively connect and disconnect between the input shaft and the second shaft. It is noted that this ninth aspect of the invention can be carried out by combining features which are described in the above-described second and fifth through eighth aspects of the invention and which relate to the dog clutch recited in these aspects of the invention.

In the vehicle transmission of each of the above-described first through eighth aspects of the invention, a power transmission path between the input shaft and the first shaft and a power transmission path between the input shaft and the second shaft are selectively established and interrupted by the dog clutch, and a power transmission path between the first shaft and the output shaft and a power transmission path between the second shaft and the output shaft are established by the synchronous meshing apparatus. Thus, the number of the dog clutch is one, irrespective of the number of the gear positions of the transmission that are to be selectively established, namely, irrespective of the numbers of the at least one first drive gear, at least one second drive gear and at least one driven gear. Therefore, the number of sensors required for detecting rotational positions of mutually-opposed dog teeth constituting the dog clutch, is not increased in proportion with increase of the number of the gear positions of the transmission, so that it is possible to increase the number of the gear positions of the transmission, while restraining increase of the number of required components.

In the ninth aspect to the invention, the connection/disconnection between the input shaft and the first shaft and the connection/disconnection between the input shaft and the second shaft can be made by the single dog clutch, so that the number of dog clutch is one in spite of the presence of the two intermediate shafts in the vehicle transmission.

In the vehicle transmission of the second aspect of the invention, the dog clutch is configured to selectively connect and disconnect between the input shaft and the first input gear and selectively connect and disconnect between the input shaft and the second input gear. Thus, when the input shaft and the first input gear are connected to each other, the input shaft and the first shaft are connected to each other via the first input gear and the first output gear in a power transmittable manner, namely, in a manner that the power is transmittable between the input shaft and the first shaft. When the input shaft and the second input gear are connected to each other, the input shaft and the second shaft are connected to each other via the second input gear and the second output gear in a power transmittable manner, namely, in a manner that the power is transmittable between the input shaft and the second shaft.

In the vehicle transmission of the third aspect of the invention, the at least one driven gear disposed on the output shaft mesh with both of the at least one even-numbered-gear-position-establishing drive gear and the at least one odd-numbered-gear-position-establishing drive gear, so that the number of the at least one driven gear disposed on the output shaft can be reduced.

In the vehicle transmission of the fourth aspect of the invention, the first and second shafts are disposed to be coaxial with each other, so that the transmission can be made compact in its radial direction.

In the vehicle transmission of the fifth aspect of the invention, when the dog teeth of the first dog ring mesh with the dog teeth of the first input gear by movement of the first dog ring toward the first input gear, the input shaft and the first input gear are connected to each other in a power transmittable manner. When the dog teeth of the second dog ring mesh with the dog teeth of the second input gear by movement of the second dog ring toward the second input gear, the input shaft and the second input gear are connected to each other in a power transmittable manner In the vehicle transmission of the sixth aspect of the invention, each of the first and second dog rings is constituted by the first annular member and the second annular member, so that the first dog teeth of the first annular member and the second dog teeth of the second annular member of each of the first and second dog rings cooperate to constitute dog teeth that are to mesh with the dog teeth of a corresponding one of the first and second input gears. When the second dog teeth collide with the dog teeth of the first or second input gear in the meshing or engaging process, the elastic member connecting between the first and second annular members is elastically deformed for alleviating a shock caused by the collision.

In the vehicle transmission of the seventh aspect of the invention, the single dog ring is provided with the dog teeth that are to mesh with the dog teeth of the first input gear and also the dog teeth that are to mesh with the dog teeth of the second input gear. Thus, the number of the dog ring is one, so that the increase of the number of required components is retrained.

In the vehicle transmission of the eighth aspect of the invention, the dog ring is constituted by the first and second annular members, the first and fourth dog teeth cooperate to constitute the dog teeth that are to mesh with the dog teeth of the first input gear, and the second and third dog teeth cooperate to constitute the dog teeth that are to mesh with the dog teeth of the second input gear. When the dog teeth of the first input gear collide with the fourth dog teeth in the engaging process, the elastic member connecting between the first and second annular members is elastically deformed for alleviating a shock caused by the collision. When the dog teeth of the second input gear collide with the second dog teeth in the engaging process, the elastic member connecting between the first and second annular members is elastically deformed for alleviating a shock caused by the collision.

BRIEF DESCRIPTION OF DRAWINGS

FIG. 4 is a table showing operations of the transmission of FIG. 1.

DESCRIPTION OF THE PREFERRED EMBODIMENTS

Hereinafter, some embodiments of the invention will be described in detail with reference to the accompanying drawings. The figures of the drawings are simplified or deformed as needed and portions are not necessarily precisely depicted in terms of dimension ratio, shape, etc.

Embodiment 1

Figure 1:
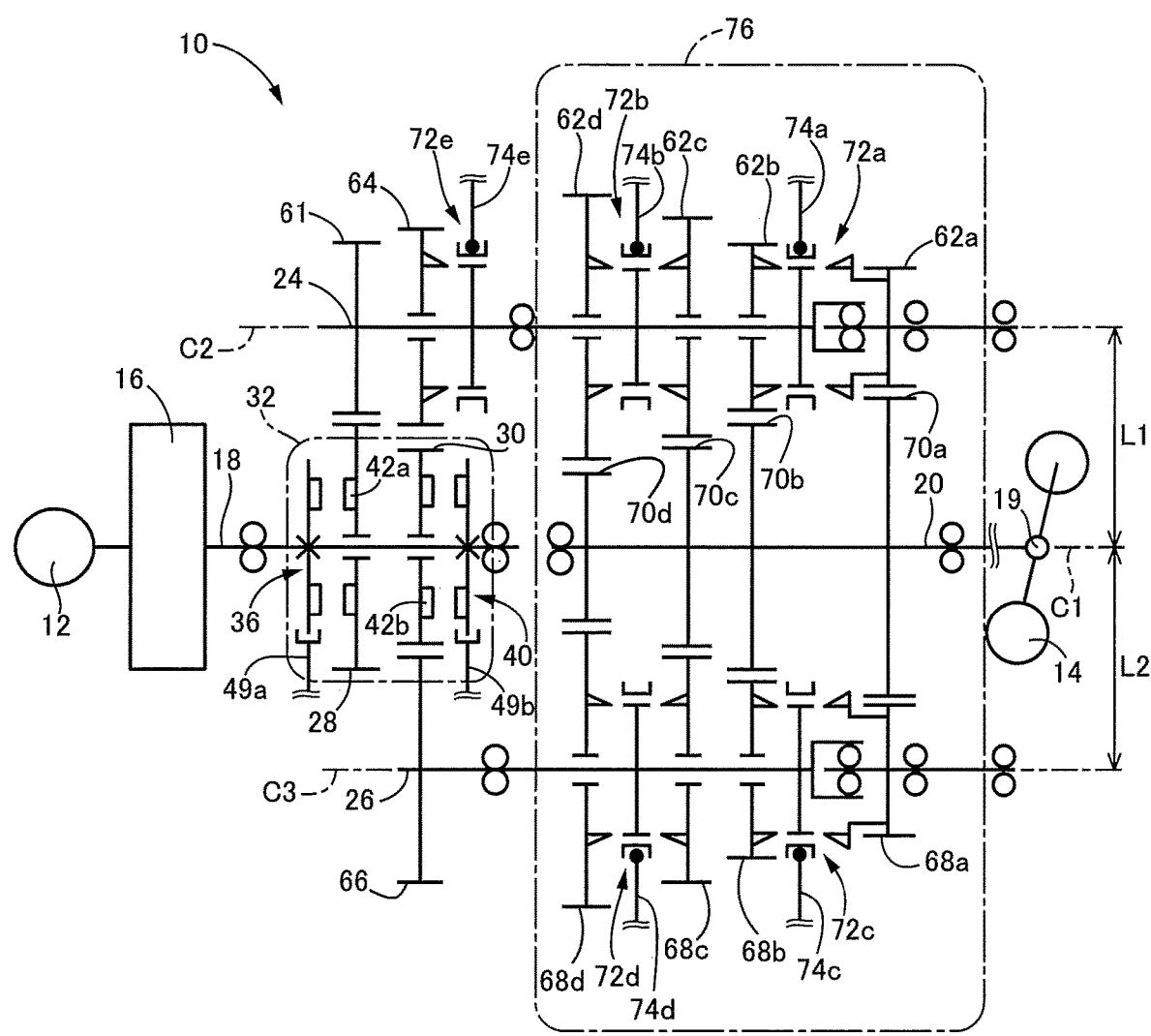
FIG. 1 is a skeleton diagram schematically showing a construction of a vehicle transmission according to an embodiment of the invention.

FIG. 1 is a skeleton diagram schematically showing a construction of a vehicle transmission 10 according to an embodiment of the invention. The transmission 10 is disposed in a power transmission path between an engine 12 and drive wheels 14 of a vehicle, and is a multistage transmission capable of establishing eight forward-drive gear positions and one rear-drive gear position.

The transmission 10 includes an input shaft 18 to which a power is to be transmitted from the engine 12 via a clutch 16, an output shaft 20 connected to the drive wheels 14 via a differential mechanism 19 and other components such that the power is transmittable from the output shaft 20 to the drive wheels 14, two intermediate shafts in the form of first and second shafts 24, 26 that are disposed in respective power transmission paths between the input shaft 18 and the output shaft 20. The input shaft 18 and the output shaft 20 are disposed in series (i.e., coaxial with each other), and extend along the same axis C1. The first shaft 24 extends along an axis C2 parallel to the axis C1. The second shaft 26 extends along an axis C3 parallel to the axis C1.

The input shaft 18 is provided with a first input gear 28 for transmitting the power to the first shaft 24 and also a second input gear 30 for transmitting the power to the second shaft 26. The first and second input gears 28, 30 are disposed to be rotatable relative to the input shaft 18.

A dog clutch 32 is disposed on the input shaft 18, and is configured to selectively connect and disconnect between the input shaft 18 and the first input gear 28 and selectively connect and disconnect between the input shaft 18 and the second input gear 30. In other words, the dog clutch 32 connects and disconnects between the input shaft 18 and the first shaft 24 and connects and disconnects between the input shaft 18 and the second shaft 26.

Figure 2:
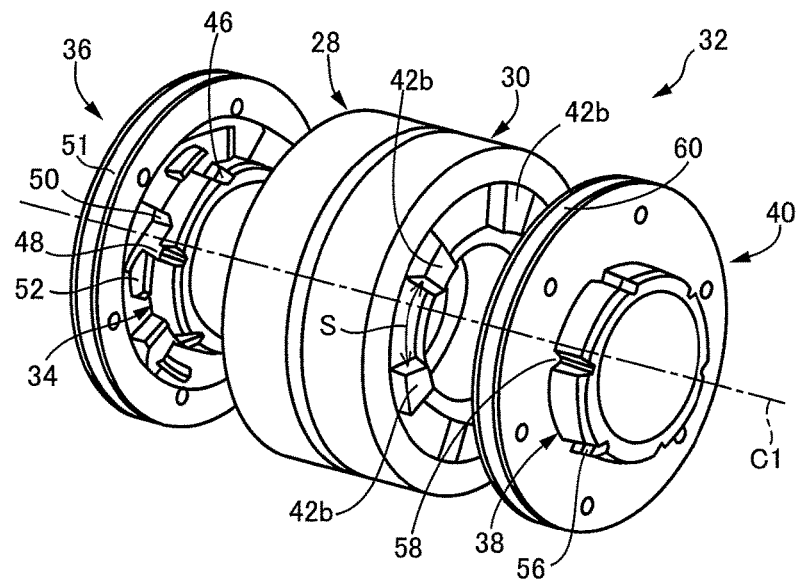
FIG. 2 is a perspective view of a dog clutch shown in FIG. 1.
Figure 3:
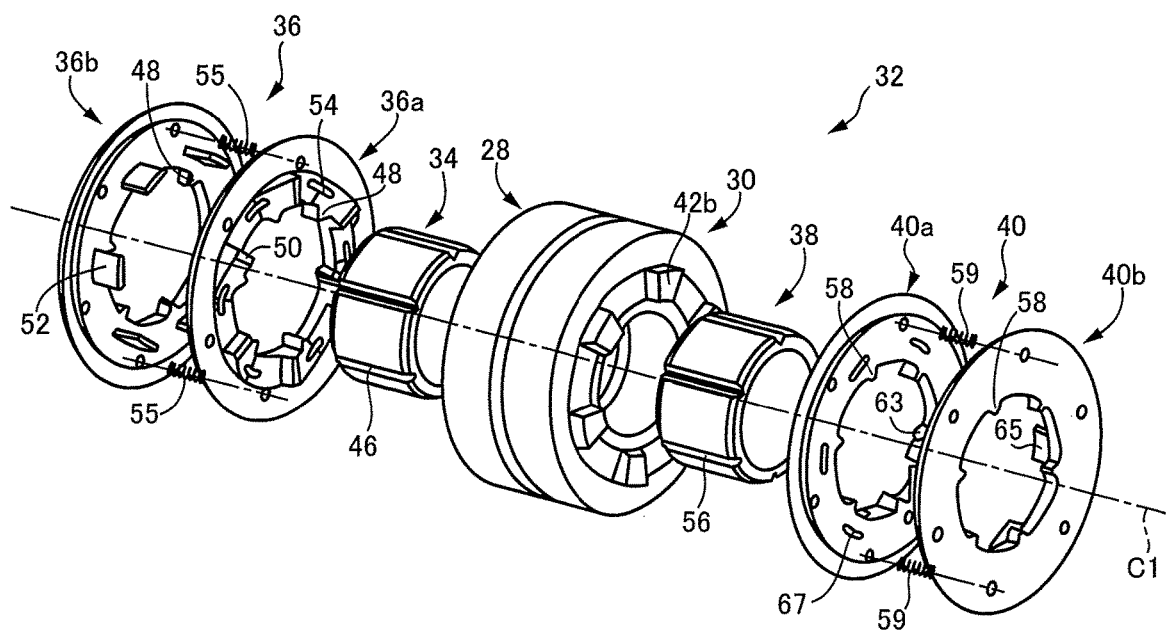
FIG. 3 is an exploded perspective view of the dog clutch of FIG. 2.

FIG. 2 is a perspective view of the dog clutch 32 of FIG. 1. FIG. 3 is an exploded view of the dog clutch 32 of FIG. 2. The dog clutch 32 includes a first hub sleeve 34, a first dog ring 36 disposed radially outside the first hub sleeve 34, a second hub sleeve 38, a second dog ring 40 disposed radially outside the second hub sleeve 38, dog teeth 42a provided in the first input gear 28, and dog teeth 42b provided in the second input gear 30. Although the dog teeth 42a of the first input gear 28 are not shown in FIG. 2, the dog teeth 42a are provided in the first input gear 28 just like the dog teeth 42b provided in the second input gear 30. However, the dog teeth 42a may be different from the dog teeth 42b in terms of the number of dog teeth.

The first and second input gears 28, 30 are located in respective positions between the first and second dog rings 36, 40 in a direction of the axis C1. The first dog ring 36 is located in a position adjacent to the first input gear 28 in the direction of the axis C1. The second dog ring 40 is located in a position adjacent to the second input gear 30 in the direction of the axis C1.

The first hub sleeve 34 is a cylindrical tubular member, and is fitted on the input shaft 18 unrotatably relative to the input shaft 18. The first hub sleeve 34 has an outer circumferential surface in which a plurality of fitting grooves 46 extending in parallel to the axis C1 are provided.

The first dog ring 36 is an annular member, and has a plurality of radially inward protrusions 48 provided in its inner circumferential portion. The inward protrusions 48 are fitted in the respective fitting grooves 46, so that the first dog ring 36 is unrotatable and movable in the direction of the axis C1, relative to the first hub sleeve 34 (i.e., relative to the input shaft 18). The first dog ring 36 has an outer circumferential surface in which an annular groove 51 is provided. A shift fork 49a shown in FIG. 1 is fitted in the annular groove 51, so that the first dog ring 36 is moved in the direction of the axis C1 when the shift fork 49a is moved in the direction of the axis C1.

As shown in FIG. 3, the first dog ring 36 includes a pair of annular members, i.e., first and second annular members 36a, 36b that are connected to each other via a spring 55 provided therebetween. The first annular member 36a is disposed in a position adjacent to the first input gear 28 in the direction of the axis C1. The second annular member 36b is disposed in a position on one of opposite sides of the first annular member 36a which is remote from the first input gear 28 in the direction of the axis C1.

The first annular member 36a is an annular member, and has a plurality of first dog teeth 50 provided in its opposed face that is opposed to the first input gear 28 in the direction of the axis C. The first dog teeth 50 protrude from the opposed face toward the first input gear 28, and can mesh with the dog teeth 42a of the first input gear 28. The first annular member 36a further has a plurality of through-holes 54 that are located between the first dog teeth 50 in its circumferential direction, such that a plurality of second dog teeth 52 (that are described below) of the second annular member 36b extend through the respective through-holes 54 after the first and second annular members 36a, 36b are assembled to each other.

The second annular member 36b is an annular member, and has the plurality of second dog teeth 52 provided in its opposed face that is opposed to the first annular member 36a in the direction of the axis C. The second dog teeth 52 protrude from the opposed face toward the first annular member 36a, and are located in respective positions, which permit the teeth 52 to extend though the respective through-holes 54 of the first annular member 36a after the first and second annular members 36a, 36b are assembled to each other. Therefore, with the first and second annular members 36a, 36b being assembled to each other, the second dog teeth 52 extending through the through-holes 54 protrude toward the first input gear 28. The first and second dog teeth 50, 52 are alternately arranged in the circumferential direction, and cooperate to constitute dog teeth of the first dog ring 36 that can mesh with the dog teeth 42a of the first input gear 28.

The first and second annular members 36a, 36b are connected to each other via the spring 55 as an elastic member. When the dog clutch 32 is to be placed in its engaged state, the first and second dog teeth 50, 52 are received in spaces S between the dog teeth 42a of the first input gear 28, which are substantially the same as spaces S between the dog teeth 42b of the second input gear 30 shown in FIG. 2. During engagement of the dog clutch 32, it is preferable that play between the dog teeth 42a and the first and second dog teeth 50, 52 is small, for reducing a shock and a rattle noise. In the present embodiment, each dog tooth of the first dog ring 36 is constituted by a pair of the first and second dog teeth 50, 52 that are adjacent to each other in the circumferential direction, so that a length of each dog tooth is made so large that the play in the circumferential direction is made small.

When the second dog teeth 52 collide with the dog teeth 42a of the first input gear 28 in the meshing or engaging process, the spring 55 connecting between the first and second annular members 36a, 36b is elastically deformed for alleviating a shock caused by the collision. Thus, the teeth collision is an issue caused only by the first dog teeth 50, so that the teeth collision is hardly caused. After the second dog teeth 52 collide with the dog teeth 42a, when the second dog teeth 52 become out of contact with the dog teeth 42a by rotation of the second dog teeth 52 relative to the dog teeth 42a, the second dog teeth 52 are returned to their original positions by elastically restoring force of the spring 55 whereby the second dog teeth 52 are brought into meshing engagement with the dog teeth 42a.

The second hub sleeve 38 is a cylindrical tubular member, and is fitted on the input shaft 18 unrotatably relative to the input shaft 18. The second hub sleeve 38 has an outer circumferential surface in which a plurality of fitting grooves 56 extending in parallel to the axis C1 are provided.

The second dog ring 40 is an annular member, and has a plurality of radially inward protrusions 58 provided in its inner circumferential portion. The inward protrusions 58 are fitted in the respective fitting grooves 56 of the second hub sleeve 38, so that the second dog ring 40 is unrotatable and movable in the direction of the axis C1, relative to the second hub sleeve 38 (i.e., relative to the input shaft 18).

The second dog ring 40 has an outer circumferential surface in which an annular groove 60 is provided. A shift fork 49b shown in FIG. 1 is fitted in the annular groove 60, so that the second dog ring 40 is moved in the direction of the axis C1 when the shift fork 49b is moved in the direction of the axis C1.

As shown in FIG. 3, the second dog ring 40 includes a pair of annular members, i.e., first and second annular members 40a, 40b that are connected to each other via a spring 59 provided therebetween.

The first annular member 40a is disposed in a position adjacent to the second input gear 30 in the direction of the axis C1. The second annular member 40b is disposed in a position on one of opposite sides of the first annular member 40a which is remote from the second input gear 30 in the direction of the axis C1.

The first annular member 40a is an annular member, and has a plurality of first dog teeth 63 provided in its opposed face that is opposed to the second input gear 30 in the direction of the axis C. The first dog teeth 63 protrude from the opposed face toward the second input gear 30, and can mesh with the dog teeth 42b of the second input gear 30. The first annular member 40a further has a plurality of through-holes 67 that are located between the first dog teeth 63 in its circumferential direction, such that a plurality of second dog teeth 65 (that are described below) of the second annular member 40b extend through the respective through-holes 54 after the first and second annular members 40a, 40b are assembled to each other.

The second annular member 40b is an annular member, and has a plurality of second dog teeth 65 provided in its opposed face that is opposed to the first annular member 40a in the direction of the axis C. The second dog teeth 65 protrude from the opposed face toward the first annular member 40a, and are located in respective positions, which permit the teeth 65 to extend though the respective through-holes 67 of the first annular member 40a after the first and second annular members 40a, 40b are assembled to each other. Therefore, with the first and second annular members 40a, 40 being assembled to each other, the second dog teeth 65 extending through the through-holes 67 protrude toward the second input gear 30. The first and second dog teeth 63, 65 are alternately arranged in the circumferential direction, and cooperate to constitute dog teeth of the second dog ring 40 that can mesh with the dog teeth 42b of the second input gear 30.

As described above, the second dog ring 40 has substantially the same construction as the above-described first dog ring 36. Therefore, the second dog ring 40 provides substantially the same advantages as the above-described first dog ring 36.

Referring back to FIG. 1, the first shaft 24 is provided with a first output gear 61 that meshes with the first input gear 28. The first output gear 61 is fixed on the first shaft 24, and is unrotatable relative to the first shaft 24. On the first shaft 24, there are disposed first drive gears (even-numbered-gear-position-establishing drive gears) 62a-62d for establishing even-numbered gear positions (2nd, 4th, 6th, 8th) and a reverse drive gear 64 for establishing a reverse gear position. Specifically, the 2nd drive gear 62a, 4th drive gear 62b, 6th drive gear 62c, 8th drive gear 62d and reverse drive gear 64 are arranged in the direction of the axis C2, in this order as viewed in a direction away from the drive wheels 14 toward the engine 12. All of the 2nd drive gear 62a, 4th drive gear 62b, 6th drive gear 62c, 8th drive gear 62d and reverse drive gear 64 are rotatable relative to the first shaft 24. The 2nd drive gear 62a is disposed on a rotary shaft that is disposed in series with the first shaft 24, unrotatably relative to the rotary shaft. However, since the rotary shaft is rotatable relative to the first shaft 24, the 2nd drive gear 62a is also rotatable relative to the first shaft 24. The reverse drive gear 64 is connected to the output shaft 20, in a power transmittable manner, via an idler gear (not shown), so that the rotation transmitted from the input shaft 18 is transmitted to the output shaft 20 after the direction of the rotation is reversed by the idler gear.

The second shaft 26 is provided with a second output gear 66 that meshes with the second input gear 30. The second output gear 66 is fixed on the second shaft 26, and is unrotatable relative to the second shaft 26. On the second shaft 26, there are disposed second drive gears (odd-numbered-gear-position-establishing drive gears) 68a-68d for establishing odd-numbered gear positions (1st, 3rd, 5th, 7th). Specifically, the 1st drive gear 68a, 3rd drive gear 68b, 5th drive gear 68c and 7th drive gear 68d are arranged in the direction of the axis C3, in this order as viewed in a direction away from the drive wheels 14 toward the engine 12. All of the 1st drive gear 68a, 3rd drive gear 68b, 5th drive gear 68c and 7th drive gear 68d are rotatable relative to the second shaft 26. The 1st drive gear 68a is disposed on a rotary shaft that is disposed in series with the second shaft 26, unrotatably relative to the rotary shaft. However, since the rotary shaft is rotatable relative to the second shaft 26, the 1st drive gear 68a is also rotatable relative to the second shaft 26.

On the output shaft 20, there are disposed a 1st-2nd driven gear 70a meshing with the 1st drive gear 68a and the 2nd drive gear 62a, a 3rd-4th driven gear 70b meshing with the 3rd drive gear 68b and the 4th drive gear 62b, a 5th-6th driven gear 70c meshing with the 5th drive gear 68c and the 6th drive gear 62c, and a 7th-8th driven gear 70d meshing with the 7th drive gear 68d and the 8th drive gear 62d. The 1st-2nd driven gear 70a, 3rd-4th driven gear 70b, 5th-6th driven gear 70c and 7th-8th driven gear 70d are arranged in the direction of the axis C1, in this order as viewed in a direction away from the drive wheels 14 toward the engine 12.

A synchronous clutch 72a having a synchronous mechanism (synchronous mesh mechanism, synchronizer) is disposed between the 2nd drive gear 62a and the 4th drive gear 62b in the direction of the axis C2, namely, is disposed in a position adjacent to the 2nd drive gear 62a and 4th drive gear 62b, which are rotatable relative to the first shaft 24, in the direction of the axis C2. The synchronous clutch 72a (as well as synchronous clutch 72b-72e described below) has a known synchronous mechanism of key type or cone type, so that the clutch 72a is placed in its engaged state upon completion of rotation synchronization that is made by the synchronous mechanism.

The synchronous clutch 72a is operated by a shift fork 74a that is fitted on a sleeve constituting the synchronous clutch 72a, and is configured to selectively connect and disconnect between the first shaft 24 and the 2nd drive gear 62a and selectively connect and disconnect between the first shaft 24 and the 4th drive gear 62b.

For example, when the shift fork 74a is moved, in the direction of the axis C2, toward the drive wheels 14 (in rightward direction as seen in FIG. 1), the sleeve constituting the synchronous clutch 72a is also moved toward the drive wheels 14 in the direction of the axis C2. In this instance, the rotations of the first shaft 24 and the 2nd drive gear 62a are synchronized by the synchronous mechanism, and the first shaft 24 and the 2nd drive gear 62a are connected to each other upon completion of the rotation synchronization whereby the power becomes transmittable from the first shaft 24 to the output shaft 20 via the 2nd drive gear 62a and the 1st-2nd driven gear 70a that meshes with the 2nd drive gear 62a, namely, whereby a power transmission path for the 2nd gear position is established. On the other hand, when the shift fork 74a is moved, in the direction of the axis C2, toward the engine 12 (in leftward direction as seen in FIG. 1), the sleeve of the synchronous clutch 72a is moved toward the engine 12 in the direction of the axis C2. In this instance, the rotations of the first shaft 24 and the 4th drive gear 62b are synchronized by the synchronous mechanism, and the first shaft 24 and the 4th drive gear 62b are connected to each other upon completion of the rotation synchronization whereby the power becomes transmittable from the first shaft 24 to the output shaft 20 via the 4th drive gear 62b and the 3rd-4th driven gear 70b that meshes with the 4th drive gear 62b, namely, whereby a power transmission path for the 4th gear position is established.

A synchronous clutch 72b having a synchronous mechanism is disposed between the 6th drive gear 62c and the 8th drive gear 62d in the direction of the axis C2, namely, is disposed in a position adjacent to the 6th drive gear 62c and 8th drive gear 62d, which are rotatable relative to the first shaft 24, in the direction of the axis C2. The synchronous clutch 72b is operated by a shift fork 74b that is fitted on a sleeve constituting the synchronous clutch 72b, and is configured to selectively connect and disconnect between the first shaft 24 and the 6th drive gear 62c and selectively connect and disconnect between the first shaft 24 and the 8th drive gear 62d.

For example, when the shift fork 74b is moved in the direction of the axis C2, toward the drive wheels 14, the sleeve of the synchronous clutch 72b is moved toward the drive wheels 14 in the direction of the axis C2. In this instance, the rotations of the first shaft 24 and the 6th drive gear 62c are synchronized by the synchronous mechanism, and the first shaft 24 and the 6th drive gear 62c are connected to each other upon completion of the rotation synchronization whereby a power transmission path for the 6th gear position is established. On the other hand, when the shift fork 74b is moved toward the engine 12 in the direction of the axis C2, the sleeve of the synchronous clutch 72b is moved toward the engine 12 in the direction of the axis C2. In this instance, the rotations of the first shaft 24 and the 8th drive gear 62d are synchronized by the synchronous mechanism, and the first shaft 24 and the 8th drive gear 62d are connected to each other upon completion of the rotation synchronization whereby a power transmission path for the 8th gear position is established.

A synchronous clutch 72c having a synchronous mechanism is disposed between the 1st drive gear 68a and the 3rd drive gear 68b in the direction of the axis C3, namely, is disposed in a position adjacent to the 1st drive gear 68a and 3rd drive gear 68b, which are rotatable relative to the second shaft 26, in the direction of the axis C3. The synchronous clutch 72c is operated by a shift fork 74c that is fitted on a sleeve constituting the synchronous clutch 72c, and is configured to selectively connect and disconnect between the second shaft 26 and the 1st drive gear 68a and selectively connect and disconnect between the second shaft 26 and the 3rd drive gear 68b.

For example, when the shift fork 74c is moved in the direction of the axis C3, toward the drive wheels 14, the sleeve of the synchronous clutch 72c is moved toward the drive wheels 14 in the direction of the axis C3. In this instance, the rotations of the second shaft 26 and the 1st drive gear 68a are synchronized by the synchronous mechanism, and the second shaft 26 and the 1st drive gear 68a are connected to each other upon completion of the rotation synchronization whereby a power transmission path for the 1st gear position is established. On the other hand, when the shift fork 74c is moved toward the engine 12 in the direction of the axis C3, the sleeve of the synchronous clutch 72c is moved toward the engine 12 in the direction of the axis C3. In this instance, the rotations of the second shaft 26 and the 3rd drive gear 68b are synchronized by the synchronous mechanism, and the second shaft 26 and the 3rd drive gear 68b are connected to each other upon completion of the rotation synchronization whereby a power transmission path for the 3rd gear position is established.

A synchronous clutch 72d having a synchronous mechanism is disposed between the 5th drive gear 68c and the 7th drive gear 68d in the direction of the axis C3, namely, is disposed in a position adjacent to the 5th drive gear 68c and 7th drive gear 68d, which are rotatable relative to the second shaft 26, in the direction of the axis C3. The synchronous clutch 72d is operated by a shift fork 74d that is fitted on a sleeve constituting the synchronous clutch 72d, and is configured to selectively connect and disconnect between the second shaft 26 and the 5th drive gear 68c and selectively connect and disconnect between the second shaft 26 and the 7th drive gear 68d.

For example, when the shift fork 74d is moved in the direction of the axis C3, toward the drive wheels 14, the sleeve of the synchronous clutch 72d is moved toward the drive wheels 14 in the direction of the axis C3. In this instance, the rotations of the second shaft 26 and the 5th drive gear 68c are synchronized by the synchronous mechanism, and the second shaft 26 and the 5th drive gear 68c are connected to each other upon completion of the rotation synchronization whereby a power transmission path for the 5th gear position is established. On the other hand, when the shift fork 74d is moved toward the engine 12 in the direction of the axis C3, the sleeve of the synchronous clutch 72d is moved toward the engine 12 in the direction of the axis C3. In this instance, the rotations of the second shaft 26 and the 7th drive gear 68d are synchronized by the synchronous mechanism, and the second shaft 26 and the 7th drive gear 68d are connected to each other upon completion of the rotation synchronization whereby a power transmission path for the 7th gear position is established.

A synchronous clutch 72e having a synchronous mechanism is disposed in a position adjacent to the reverse drive gear 64, which is rotatable relative to the first shaft 24, in the direction of the axis C2. The synchronous clutch 72e is operated by a shift fork 74e that is fitted on a sleeve constituting the synchronous clutch 72e, and is configured to selectively connect and disconnect between the first shaft 24 and the reverse drive gear 64.

For example, when the shift fork 74e is moved in the direction of the axis C2, toward the engine 12, the sleeve of the synchronous clutch 72e is moved toward the engine 12 in the direction of the axis C2. In this instance, the rotations of the first shaft 24 and the reverse drive gear 64 are synchronized by the synchronous mechanism, and the first shaft 24 and the reverse drive gear 64 are connected to each other upon completion of the rotation synchronization whereby a power transmission path for the reverse gear position is established. In the present embodiment, the synchronous clutches 72a-72e cooperate to constitute a synchronous meshing apparatus that includes a first synchronous meshing device constituted by first synchronous clutches in the form of the clutches 72a, 72b and a second synchronous meshing device constituted by second synchronous clutches in the form of the clutches 72c, 72d.

In the transmission 10, the 1st drive gear 68a, 2nd drive gear 62a and 1st-2nd driven gear 70a overlap with one another as viewed in a radial direction of the output shaft 20, so that the 1st-2nd driven gear 70a meshes with both of the 1st drive gear 68a and 2nd drive gear 62a. The 3rd drive gear 68b, 4th drive gear 62b and 3rd-4th driven gear 70b overlap with one another as viewed in the radial direction, so that the 3rd-4th driven gear 70b meshes with both of the 3rd drive gear 68b and 4th drive gear 62b. The 5th drive gear 68c, 6th drive gear 62c and 5th-6th driven gear 70c overlap with one another as viewed in the radial direction, so that the 5th-6th driven gear 70c meshes with both of the 5th drive gear 68c and 6th drive gear 62c. The 7th drive gear 68d, 8th drive gear 62d and 7th-8th driven gear 70d overlap with one another as viewed in the radial direction, so that the 7th-8th driven gear 70d meshes with both of the 7th drive gear 68d and 8th drive gear 62d. Thus, each of the driven gears 70a-70d is arranged to mesh with corresponding two drive gears, so that the number of the driven gears disposed on the output shaft 20 is reduced whereby the number of required components can be reduced and the axial length of the transmission 10 can be reduced.

A radial distance L1 between the axis C1 and axis C2 and a radial distance L2 between the axis C1 and axis C3 are made equal to each other, so that the 1st drive gear 68a and 2nd drive gear 62a are provided by respective gears identical with each other, the 3rd drive gear 68b and 4th drive gear 62b are provided by respective gears identical with each other, the 5th drive gear 68c and 6th drive gear 62c are provided by respective gears identical with each other, and the 7th drive gear 68d and the 8th drive gear 62d are provided by respective gears identical with each other. In connection with the identical drive gears, the synchronous clutches 72a-72e and shifting mechanisms constituting the shift forks 74a-74e also can be provided by elements each of which is identical with a corresponding one of the elements. A gear ratio between the first input gear 28 and the first output gear 61 and a gear ratio between the second input gear 30 and the second output gear 66 are different from each other, so that the gear positions provide respective speed ratios different from one another although each of the drive gears is identical with a corresponding one of the drive gears.

FIG. 4 is a table showing operations of the transmission 10 constructed as described above. In FIG. 4, there are presented, in its leftmost row, gear positions to be established in the transmission 10, wherein "N" represents neutral position, "R" represents reverse gear position and "1"-"8" represent 1st-8th gear positions. In central rows of FIG. 4, there are presented states of operation of the dog clutch 32 (synchroless dog clutch), more precisely, in row of "Odd" it is indicated that the second dog ring 40 and the second input gear 30 are engaged with each other when an odd-numbered gear position or neutral position is to be established, and in row of "Even" it is indicated that the first dog ring 36 and the first input gear 28 are engaged with each other when an even-numbered gear position or reverse gear position is to be established. In right rows of FIG. 4, there are presented states of operation between each of the drive gears and a corresponding one of the first and second shafts 24, 26 when each of the gear positions is to be established. In the right rows of FIG. 4, "O" indicates an engagement (connection) of the corresponding drive gear with the first shaft 24 or second shaft 26, blank indicates a release (disconnection) of the corresponding drive gear from the first shaft 24 or second shaft 26, and "Δ" indicates a state in which a power transmission path is being established by a connection of the corresponding drive gear with the first shaft 24 or second shaft 26 but without a torque being transmitted the established power transmission path. It is noted that the above-described engagement (connection) is interpreted to mean that the rotation of the corresponding drive gear relative to the first shaft 24 or second shaft 26 is restricted by operation of the corresponding synchronous clutch (that is disposed to be adjacent to the corresponding drive gear), and that the above-described release (disconnection) is interpreted to mean that the relative rotation is allowed. It is also noted that the restriction of the relative rotation is interpreted to encompass an inhibition of the relative rotation.

When the neutral position "N" is to be established, the second dog ring 40 and the second input gear 30 are engaged with each other (as indicated in the row of "Odd") whereby the second input gear 30 is connected to the input shaft 18 so that the input shaft 18 and the second shaft 26 are connected to each other via the second input gear 30 and the second output gear 66 in a power transmittable manner. Meanwhile, all of the drive gears for establishing the 1st-8th gear positions are released or disconnected from the first shaft 24 or second shaft 26, so that the power is not transmitted to the output shaft 20.

When the reverse gear position "R" is to be established, the first dog ring 36 and the first input gear 28 are engaged with each other (as indicated in the row of "Even"), and the reverse drive gear 64 is connected to the first shaft 24 through the synchronous clutch 72e, for establishing the rear gear position. In this instance, the input shaft 18 and the first shaft 24 are connected to each other via the first input gear 28 and the second output gear 61 in a power transmittable manner, and a power transmission path for the reverse gear position is established whereby the reverse gear position is established in the transmission 10.

When the 1st gear position "1" is to be established, the second dog ring 40 and the second input gear 30 are engaged with each other (as indicated in the row of "Odd"), and the 1st drive gear 68a is connected to the second shaft 26 through the synchronous clutch 72c, for establishing the 1st gear position, and also the 2nd drive gear 62a is connected to the first shaft 24 through the synchronous clutch 72a, for establishing the 2nd gear position. In this instance, the input shaft 18 and the second shaft 26 are connected to each other in a power transmittable manner, and a power transmission path for the 1st gear position and a power transmission path for the 2nd gear position 1st are established. The input shaft 18 is connected to the second shaft 26 in a power transmittable manner, and the 1st drive gear 68a is connected to the second shaft 26, so that the 1st gear position is established in the transmission 10. Meanwhile, although the power transmission path for the 2nd gear position is established, the power (torque) is not transmitted to the power transmission path for the 2nd gear position, because the power transmission between the input shaft 18 and the first shaft 24 is interrupted. It is noted that the purpose for establishing the power transmission path for the 2nd gear position (that is close in speed ratio to the 1st gear position) when the 1st gear position is established, is making it possible to quickly shift up to the 2nd gear position when the gear shift is required.

When the 2nd gear position "2" is to be established, the first dog ring 36 and the first input gear 28 are engaged with each other (as indicated in the row of "Even"), the 2nd drive gear 62a is connected to the first shaft 24 through the synchronous clutch 72a, for establishing the 2nd gear position, and also a selected one of the 1st and 3rd drive gears 68a, 68b is connected to the second shaft 26 through the synchronous clutch 72c. In this instance, the first input gear 28 is connected to the input shaft 18 through the dog clutch 32 (first dog ring 36), whereby the input shaft 18 and the first shaft 24 are connected to each other in a power transmittable manner via the first input gear 28 and the first output gear 61. In addition to the power transmission path for the 2nd gear position, a selected one of the power transmission path for the 1st gear position and the power transmission path for the 3rd gear position is established. The input shaft 18 and the first shaft 24 are connected to each other in a power transmittable manner, and the 2nd drive gear 62a is connected to the first shaft 24, for establishing the 2nd gear position, so that the 2nd gear position is established in the transmission 10. Meanwhile, although the power transmission path for the 1st gear position or 3rd gear position is established, the power (torque) is not transmitted to the power transmission path for the 1st or 3rd gear position, because the power transmission between the input shaft 18 and the second shaft 26 is interrupted. The above-described selected one of the power transmission path for the 1st gear position and the power transmission path for the 3rd gear position is determined depending on a running state of the vehicle. For example, in a case when the vehicle is being accelerated, the power transmission path for the 3rd gear position is established because a shift up is expected in such a case of the acceleration. In a case when the vehicle is being decelerated, the power transmission path for the 1st gear position is established because a shift down is expected in such a case of the deceleration. The purpose for establishing the power transmission path for the 1st or 3rd gear position during running with the 2nd gear position, is making it possible to quickly shift down or up to the 1st or 3rd gear position that is adjacent to the 2nd gear position when the gear shift is required.

When the 3rd gear position "3" is to be established, the second dog ring 40 and the second input gear 30 are engaged with each other (as indicated in the row of "Odd"), the 3rd drive gear 68b is connected to the second shaft 26 through the synchronous clutch 72c, for establishing the 3rd gear position, and also a selected one of the 2nd and 4th drive gears 62a, 62b is connected to the first shaft 24 through the synchronous clutch 72a. In this instance, the second input gear 26 is connected to the input shaft 18 via the second input gear 30 and the second output gear 66 in a power transmittable manner. In addition to the power transmission path for the 3rd gear position, a selected one of the power transmission path for the 2nd gear position and the power transmission path for the 4th gear position is established. The input shaft 18 and the second shaft 26 are connected to each other in a power transmittable manner, and the 3rd drive gear 68b is connected to the second shaft 26, for establishing the 3rd gear position, so that the 3rd gear position is established in the transmission 10. Meanwhile, although the power transmission path for the 2nd gear position or 4th gear position is established, the power (torque) is not transmitted to the power transmission path for the 2nd or 4th gear position, because the power transmission between the input shaft 18 and the first shaft 24 is interrupted. The above-described selected one of the power transmission path for the 2nd gear position and the power transmission path for the 4th gear position is determined depending on the running state of the vehicle. The purpose for establishing the power transmission path for the 2nd or 4th gear position during running with the 3rd gear position, is making it possible to quickly shift down or up to the 2nd or 4th gear position when the gear shift is required.

When the 4th gear position "4" is to be established, the first dog ring 36 and the first input gear 28 are engaged with each other (as indicated in the row of "Even"), the 4th drive gear 62b is connected to the first shaft 24 through the synchronous clutch 72a, for establishing the 4th gear position, and also a selected one of the 3rd and 5th drive gears 68b, 68c is connected to the second shaft 26 through the synchronous clutch 72c or synchronous clutch 72d. In this instance, the input shaft 18 and the first shaft 24 are connected to each other in a power transmittable manner via the first input gear 28 and the first output gear 61. In addition to the power transmission path for the 4th gear position, a selected one of the power transmission path for the 3rd gear position and the power transmission path for the 5th gear position is established. The input shaft 18 and the first shaft 24 are connected to each other in a power transmittable manner, and the 4th drive gear 62b is connected to the first shaft 24, for establishing the 4th gear position, so that the 4th gear position is established in the transmission 10. Meanwhile, although the power transmission path for the 3rd gear position or 5th gear position is established, the power (torque) is not transmitted to the power transmission path for the 3rd or 5th gear position, because the power transmission between the input shaft 18 and the second shaft 26 is interrupted. The above-described selected one of the power transmission path for the 3rd gear position and the power transmission path for the 5th gear position is determined depending on the running state of the vehicle. The purpose for establishing the power transmission path for the 3rd or 5th gear position during running with the 4th gear position, is making it possible to quickly shift down or up to the 3rd or 5th gear position when the gear shift is required.

When the 5th gear position "5" is to be established, the second dog ring 40 and the second input gear 30 are engaged with each other (as indicated in the row of "Odd"), the 5th drive gear 68c is connected to the second shaft 26 through the synchronous clutch 72d, for establishing the 5th gear position, and also a selected one of the 4th and 6th drive gears 62b, 62c is connected to the first shaft 24 through the synchronous clutch 72a (4th gear position) or synchronous clutch 72b (6th gear position). In this instance, the second input gear 26 is connected to the input shaft 18 via the second input gear 30 and the second output gear 66 in a power transmittable manner. In addition to the power transmission path for the 5th gear position, a selected one of the power transmission path for the 4th gear position and the power transmission path for the 6th gear position is established. The input shaft 18 and the second shaft 26 are connected to each other in a power transmittable manner, and the 5th drive gear 68c is connected to the second shaft 26, for establishing the 5th gear position, so that the 5th gear position is established in the transmission 10. Meanwhile, although the power transmission path for the 4th gear position or 6th gear position is established, the power (torque) is not transmitted to the power transmission path for the 4th or 6th gear position, because the power transmission between the input shaft 18 and the first shaft 24 is interrupted. The above-described selected one of the power transmission path for the 4th gear position and the power transmission path for the 6th gear position is determined depending on the running state of the vehicle. The purpose for establishing the power transmission path for the 4th or 6th gear position during running with the 5th gear position, is making it possible to quickly shift down or up to the 4th or 6th gear position when the gear shift is required.

When the 6th gear position "6" is to be established, the first dog ring 36 and the first input gear 28 are engaged with each other (as indicated in the row of "Even"), the 6th drive gear 62c is connected to the first shaft 24 through the synchronous clutch 72b, for establishing the 6th gear position, and also a selected one of the 5th and 7th drive gears 68c, 68d is connected to the second shaft 26 through the synchronous clutch 72d. In this instance, the input shaft 18 and the first shaft 24 are connected to each other in a power transmittable manner via the first input gear 28 and the first output gear 61. In addition to the power transmission path for the 6th gear position, a selected one of the power transmission path for the 5th gear position and the power transmission path for the 7th gear position is established. The input shaft 18 and the first shaft 24 are connected to each other in a power transmittable manner, and the 6th drive gear 62c is connected to the first shaft 24, for establishing the 6th gear position, so that the 6th gear position is established in the transmission 10. Meanwhile, although the power transmission path for the 5th gear position or 7th gear position is established, the power (torque) is not transmitted to the power transmission path for the 5th or 7th gear position, because the power transmission between the input shaft 18 and the second shaft 26 is interrupted. The above-described selected one of the power transmission path for the 5th gear position and the power transmission path for the 7th gear position is determined depending on the running state of the vehicle. The purpose for establishing the power transmission path for the 5th or 7th gear position during running with the 6th gear position, is making it possible to quickly shift down or up to the 5th or 7th gear position when the gear shift is required.

When the 7th gear position "7" is to be established, the second dog ring 40 and the second input gear 30 are engaged with each other (as indicated in the row of "Odd"), the 7th drive gear 68d is connected to the second shaft 26 through the synchronous clutch 72d, for establishing the 7th gear position, and also a selected one of the 6th and 8th drive gears 62c, 62d is connected to the first shaft 24 through the synchronous clutch 72b. In this instance, the second input gear 26 is connected to the input shaft 18 via the second input gear 30 and the second output gear 66 in a power transmittable manner. In addition to the power transmission path for the 7th gear position, a selected one of the power transmission path for the 6th gear position and the power transmission path for the 8th gear position is established. The input shaft 18 and the second shaft 26 are connected to each other in a power transmittable manner, and the 7th drive gear 68d is connected to the second shaft 26, for establishing the 7th gear position, so that the 7th gear position is established in the transmission 10. Meanwhile, although the power transmission path for the 6th gear position or 8th gear position is established, the power (torque) is not transmitted to the power transmission path for the 6th or 8th gear position, because the power transmission between the input shaft 18 and the first shaft 24 is interrupted. The above-described selected one of the power transmission path for the 6th gear position and the power transmission path for the 8th gear position is determined depending on the running state of the vehicle. The purpose for establishing the power transmission path for the 6th or 8th gear position during running with the 7th gear position, is making it possible to quickly shift down or up to the 6th or 8th gear position when the gear shift is required.

When the 8th gear position "8" is to be established, the first dog ring 36 and the first input gear 28 are engaged with each other (as indicated in the row of "Even"), the 8th drive gear 62d is connected to the first shaft 24 through the synchronous clutch 72b, for establishing the 8th gear position, and also the 7th drive gear 68d is connected to the second shaft 26 through the synchronous clutch 72d. In this instance, the input shaft 18 and the first shaft 24 are connected to each other in a power transmittable manner via the first input gear 28 and the first output gear 61. In addition to the power transmission path for the 8th gear position, the power transmission path for the 7th gear position is established. The input shaft 18 and the first shaft 24 are connected to each other in a power transmittable manner, and the 8th drive gear 62d is connected to the first shaft 24, for establishing the 8th gear position, so that the 8th gear position is established in the transmission 10. Meanwhile, although the power transmission path for the 7th gear position is established, the power (torque) is not transmitted to the power transmission path for the 7th gear position, because the power transmission between the input shaft 18 and the second shaft 26 is interrupted. The purpose for establishing the power transmission path for the 7th gear position during running with the 8th gear position, is making it possible to quickly shift down to the 7th gear position when the gear shift is required.

As shown in the table of FIG. 4, in the dog clutch 32, either one of the first and second dog rings 36, 40 is engaged with a corresponding one of the first and second input gears 28, 30, so that the power transmission is not interrupted in the dog clutch 32. When the power transmission is to be interrupted (neutralized) in the transmission 10, the power transmission is interrupted by releasing all of the synchronous clutches 72a-72e. It is because the engagement action is hard to be performed in the dog clutch 32 during stop of rotation, while the engagement action can be performed in each of the synchronous clutches 72a-72e even during stop of rotation, owing to the provision of the synchronous mechanism. That is, even during stop of the vehicle, it is possible to switch the gear position from the neutral positon to the 1st gear position or to the reverse gear position.

In the dog clutch 32, the circumferential positions of the dog teeth opposed to one another have to be detected by sensors so as to avoid the teeth collision in the engaging process. In the present embodiment in which the number of the dog clutch 32 is only one, a large number of sensors for detecting the circumferential positions of the dog teeth are not required so that an increase of number of components is avoided. Further, the dog teeth do not have to be formed particularly to have complicated shapes for avoiding the teeth collision so that an increase of manufacturing cost is avoided.

Further, in the present embodiment, the transmission 10 includes a multistage gearbox 76 as a portion in which the power transmission path for each of the 1st-8th gear positions is to be established, wherein the multistage gearbox 76 is provided apart from the dog clutch 32. In the multistage gearbox 76 in which the synchronous clutches 72a-72e are provided to selectively establish and interrupt the power transmission paths for the respective gear positions, there is employed a shift select system in which the shift forks 74a-74e operating the respective synchronous clutches 72a-72e can be operated independently of one another whereby the synchronous clutches 72a-72e can be operated independently of one another. Therefore, the neutral position can be established directly from any of the other gear positions, thereby making it possible to perform a so-called "jumping shift" such as shifting up from the 1st gear position to the 3rd gear position. If dog clutches were provided in place of the synchronous clutches 72a-72e, a so called "barrel system" is required to be provided to operate the shift forks 74a-74e simultaneously with one another for performing shifting action at a suitable timing, thereby making it difficult to perform the jumping shift.

As described above, in the present embodiment, the power transmission path between the input shaft 18 and the first shaft 24 and the power transmission path between the input shaft 18 and the second shaft 26 are selectively established and interrupted by the dog clutch 32, which is configured to selectively connect and disconnect between the input shaft 18 and the first shaft 24 and selectively connect and disconnect between the input shaft 18 and the second shaft 26. Meanwhile, the power transmission paths for the even-numbered gear positions and odd-numbered gear positions are selectively established and interrupted by the synchronous clutches 72a-72d. Owing to this arrangement, the number of the dog clutch 32 is one, irrespective of the number of the gear positions established in the transmission 10. Thus, the number of the sensors for detecting the circumferential positions of the dog teeth of the dog clutch 32 opposed to one another is not increased depending on the number of the gear positions established in the transmission, so that the number of the gear positions in the transmission can be increased without increasing the number of components.

Further, in the present embodiment, the driven gears 70a-70d disposed on the output shaft 20 are configured to mesh with the first drive gears 62a-62d for establishing the respective even-numbered gear positions and also with the second drive gears 68a-68d for establishing the respective odd-numbered gear positions, so that the number of the driven gears disposed on the output shaft 20 can be reduced.

Further, the connection/disconnection between the input shaft 18 and the first shaft 24 and the connection/disconnection between the input shaft 18 and the second shaft 26 are made by the dog clutch 32. Therefore, when the first shaft 24 or second shaft 26 is disconnected from the input shaft 18, a drag between the input shaft 18 and a disconnected one of the first and second shafts 24, 26 is not caused, so that the efficiency of the transmission 10 is improved. If a wet multi-plate were used in place of the dog clutch 32, a drag would be caused even during a released state of the clutch whereby the efficiency of the transmission 10 would be reduced.

Other embodiments of the present invention will be described. In the following description, the same reference sings as used in the preceding embodiment will be used to identify the corresponding elements which will not be described.

Embodiment 2

Figure 5:
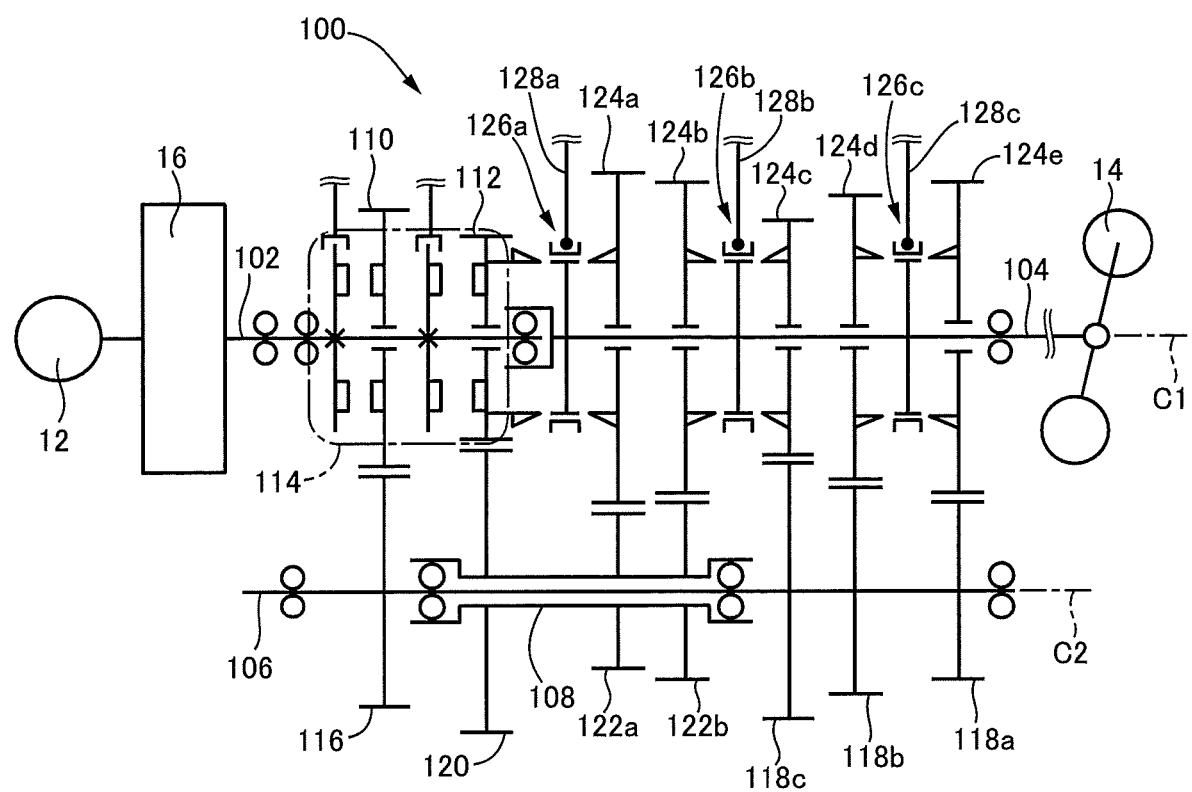
FIG. 5 is a skeleton diagram schematically showing a construction of a vehicle transmission according to another embodiment of the invention.

FIG. 5 is a skeleton diagram showing a vehicle transmission 100 according to another embodiment of the invention. The transmission 100 is disposed in a power transmission path between the engine 12 and the drive wheels 14. Unlike in the transmission 10 according to the above-described embodiment, in the transmission 100 according to the present embodiment, two intermediate shafts, i.e., first and second shafts 106, 108 are arranged to be coaxial with each other and overlap with each other as viewed in a radial direction of an output shaft 104. The first shaft 106 is provided with first drive gears (even-numbered-gear-position-establishing drive gears) 118a-118c for establishing even-numbered gear positions. The second shaft 108 is provided with second drive gears (odd-numbered-gear-position-establishing drive gears) 122a, 122b for establishing odd-numbered gear positions. Hereinafter, there will be mainly described constructions different from those of the above-described transmission 10.

The transmission 100 includes: an input shaft 102 connected to the engine 12 via the clutch 16 in a power transmittable manner; the above-described output shaft 104 connected to the drive wheels 14 in a power transmittable manner; the above-described first shaft 106 provided with the first drive gears 118a-118c for establishing the even-numbered gear positions (2nd gear position, 4th gear position, 6th gear position); and the above-described second shaft 108 provided with the second drive gears 122a, 122b for establishing the odd-numbered gear positions (1st gear position, 3rd gear position). The input and output shafts 102, 104 are disposed in series (i.e., coaxial with each other), and extend along the same axis C1. The first and second shafts 106, 108 extend along the same C2, and overlap with each other as viewed in the radial direction.

The second shaft 108 is constituted by a cylindrical tubular member having an axial through-hole through which the first shaft 106 extends. That is, the first and second shafts 106, 108 are arranged to have a double cylindrical shape as viewed in the axial direction. Thus, with the first and second shafts 106, 108 being coaxial with each other, the transmission 100 is constructed to have two parallel axes as a whole.

The input shaft 102 is provided with a first input gear 110 for transmitting the power to the first shaft 106 and also a second input gear 112 for transmitting the power to the second shaft 108. The first input gear 110 and the second input gear 112 are disposed to be rotatable relative to the input shaft 102.

A dog clutch 114 is disposed on the input shaft 102, and is configured to selectively connect and disconnect between the input shaft 102 and the first input gear 110 (i.e., between the input shaft 102 and the first shaft 106) and selectively connect and disconnect between the input shaft 102 and the second input gear 112 (i.e., between the input shaft 102 and the second shaft 108). Since the dog clutch 114 is not basically different from the dog clutch 32 in the above-described embodiment, the detailed description will not be provided.

A first output gear 116 meshing with the first input gear 110 is disposed on the first shaft 106, unrotatably relative to the first shaft 106. Further, the first drive gears 118a-118c for establishing the even-numbered gear positions are disposed on the first shaft 106. Specifically, the 2nd drive gear 118a, 4th drive gear 118b and 6th drive gear 118c are arranged in the direction of the axis C2, in this order as viewed in a direction away from the drive wheels 14 toward the engine 12. All of the first drive gears 118a-118c are unrotatable relative to the first shaft 106.

A second output gear 120 meshing with the second input gear 112 is disposed on the second shaft 108, unrotatably relative to the second shaft 108. Further, the second drive gears 122a, 122b for establishing the odd-numbered gear positions are disposed on the second shaft 108. Specifically, the 1st drive gear 122a and 3rd drive gear 122b are arranged in the direction of the axis C2, in this order as viewed in a direction away from the engine 12 toward the drive wheels 14. Both of the 1st and 3rd drive gears (second drive gears) 122a, 122b are unrotatable relative to the second shaft 108.

On the output shaft 104, there are disposed a 1st driven gear 124a, a 3rd driven gear 124b, a 6th driven gear 124c, a 4th driven gear 124d and a 2nd driven gear 124e, which are arranged in the direction of the axis C1, in this order as viewed in a direction away from the engine 12 toward the drive wheels 14. The first drive gears 118a-118c and the second drive gears 122a, 122b are located in respective positons that are different from each other in the direction of the axis C2, and mesh with the respective driven gears 124a-124e, i.e., respective different driven gears. All of the driven gears 124a-124e are rotatable relative to the output shaft 104. In the present embodiment, each of the 6th driven gear 124c, 4th driven gear 124d and 2nd driven gear 124e corresponds to a first driven gear, while each of the 1st driven gear 124a and 3rd driven gear 124b corresponds to a second driven gear.

A synchronous clutch 126a having a synchronous mechanism is disposed between the second input gear 112 and the 1st driven gear 124a in the direction of the axis C1, namely, is disposed in a position adjacent to the 1st driven gear 124a, which is rotatable relative to the output shaft 104, in the direction of the axis C1. The synchronous clutch 126a is operated by a shift fork 128a that is fitted on a sleeve constituting the synchronous clutch 126a, and is configured to selectively connect and disconnect between the input shaft 102 and the output shaft 104 and selectively connect and disconnect between the 1st driven gear 124a and the output shaft 104.

For example, when the shift fork 128a is moved, in the direction of the axis C1, toward the engine 12, the sleeve constituting the synchronous clutch 126a is moved toward the engine 12 in the direction of the axis C1. In this instance, the rotations of the second input gear 112 and the output shaft 104 are synchronized by the synchronous mechanism, and the second input gear 112 and the output shaft 104 are connected to each other upon completion of the rotation synchronization whereby a power transmission path for the 5th gear position is established. This 5th gear position is established with the input shaft 102 and the output shaft 104 being directly connected to each other. When the shift fork 128a is moved, in the direction of the axis C1, toward the drive wheels 14, the sleeve of the synchronous clutch 126a is moved toward the drive wheels 14 in the direction of the axis C1. In this instance, the rotations of the 1st driven gear 124a and the output shaft 104 are synchronized by the synchronous mechanism, and the 1st driven gear 124a and the output shaft 104 are connected to each other upon completion of the rotation synchronization whereby a power transmission path for the 1st gear position is established.

A synchronous clutch 126b having a synchronous mechanism is disposed between the 3rd driven gear 124b and the 6th driven gear 124c in the direction of the axis C1, namely, is disposed in a position adjacent to the 3rd driven gear 124b and 6th driven gear 124c, which are rotatable relative to the output shaft 104, in the direction of the axis C1. The synchronous clutch 126b is operated by a shift fork 128b that is fitted on a sleeve constituting the synchronous clutch 126b, and is configured to selectively connect and disconnect between the 3rd driven gear 124b and the output shaft 104 and selectively connect and disconnect between the 6th driven gear 124c and the output shaft 104.

For example, when the shift fork 128b is moved, in the direction of the axis C1, toward the engine 12, the sleeve constituting the synchronous clutch 126b is moved toward the engine 12 in the direction of the axis C1. In this instance, the rotations of the 3rd driven gear 124b and the output shaft 104 are synchronized by the synchronous mechanism, and the 3rd driven gear 124b and the output shaft 104 are connected to each other upon completion of the rotation synchronization whereby a power transmission path for the 3rd gear position is established. When the shift fork 128b is moved, in the direction of the axis C1, toward the drive wheels 14, the sleeve of the synchronous clutch 126b is moved toward the drive wheels 14 in the direction of the axis C1. In this instance, the rotations of the 6th driven gear 124c and the output shaft 104 are synchronized by the synchronous mechanism, and the 6th driven gear 124c and the output shaft 104 are connected to each other upon completion of the rotation synchronization whereby a power transmission path for the 6th gear position is established.

A synchronous clutch 126c having a synchronous mechanism is disposed between the 4th driven gear 124d and the 2nd driven gear 124e in the direction of the axis C1, namely, is disposed in a position adjacent to the 4th driven gear 124d and 2nd driven gear 124e, which are rotatable relative to the output shaft 104, in the direction of the axis C1. The synchronous clutch 126c is operated by a shift fork 128c that is fitted on a sleeve constituting the synchronous clutch 126c, and is configured to selectively connect and disconnect between the 4th driven gear 124d and the output shaft 104 and selectively connect and disconnect between the 2nd driven gear 124e and the output shaft 104.

For example, when the shift fork 128c is moved, in the direction of the axis C1, toward the engine 12, the sleeve constituting the synchronous clutch 126c is moved toward the engine 12 in the direction of the axis C1. In this instance, the rotations of the 4th driven gear 124d and the output shaft 104 are synchronized by the synchronous mechanism, and the 4th driven gear 124d and the output shaft 104 are connected to each other upon completion of the rotation synchronization whereby a power transmission path for the 4th gear position is established. When the shift fork 128c is moved, in the direction of the axis C1, toward the drive wheels 14, the sleeve of the synchronous clutch 126c is moved toward the drive wheels 14 in the direction of the axis C1. In this instance, the rotations of the 2nd driven gear 124e and the output shaft 104 are synchronized by the synchronous mechanism, and the 2nd driven gear 124e and the output shaft 104 are connected to each other upon completion of the rotation synchronization whereby a power transmission path for the 2nd gear position is established. In the present embodiment, the synchronous clutches 126a-126c cooperate to constitute a synchronous meshing apparatus that includes a first synchronous meshing device constituted by first synchronous clutches in the faun of the clutches 126b, 126c and a second synchronous meshing device constituted by second synchronous clutches in the form of the clutches 126a, 126b. The synchronous clutch 126b corresponds to either of the first and second synchronous clutches.

The transmission 100 constructed as described above is operated substantially in the same manner as the transmission 10 of the above-described embodiment. That is, the transmission 100 is also operated as shown in the table of FIG. 4, except that the transmission 100 is not placed in the 7th and 8th gear positons. In the present embodiment, too, the shift select system is employed to enable the shift forks 128a-128c to be operated independently of one another whereby a jumping shift can be performed. Since the transmission 100 is operated in a manner not basically different from the above-described transmission 10, the detailed description will not be provided.

Further, like in the above-described transmission 10, the number of the dog clutch 114 is one in the transmission 100, irrespective of the number of the gear positions established in the transmission 100, so that the number of the sensors for detecting the circumferential positions of the dog teeth is not increased depending on the number of the gear positions established in the transmission. Thus, the transmission 100 provides substantially the same advantages as the above-described transmission 10. Further, in the transmission 100 in which the first and second shafts 106, 108 arranged to extend along the same axis C2, the transmission 100 is constituted by two axes as a whole, so that the transmission 100 can be made more compact in the radial direction than the above-described transmission 10.

Embodiment 3

Figure 6:
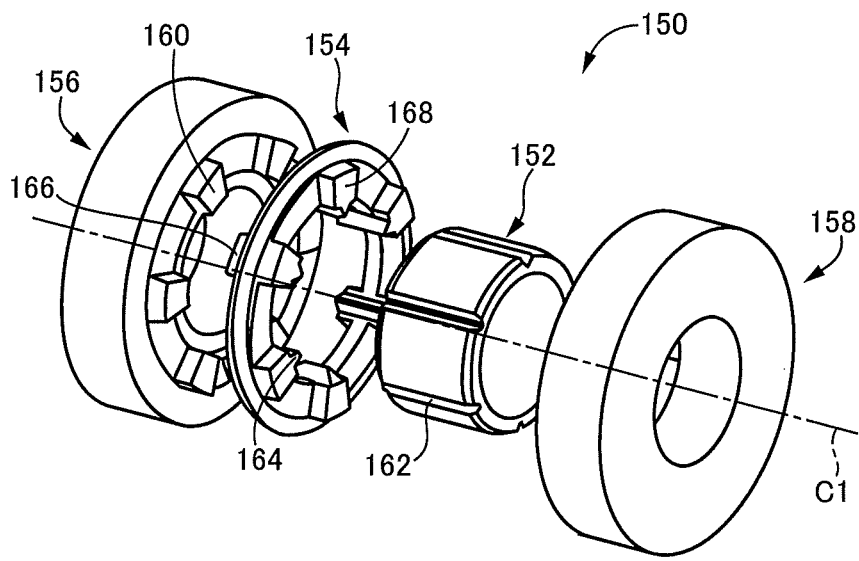
FIG. 6 is an exploded perspective view of a dog clutch according to still another embodiment of the invention.

FIG. 6 is an exploded perspective view of a dog clutch 150 according to still another embodiment of the invention. This dog clutch 150 is used in place of, for example, the dog clutch 32 (used in the transmission 10) or the dog clutch 114 (used in the transmission 100). The dog clutch 150 is constituted principally by a single hub sleeve 152 and a single dog ring 154.

The dog clutch 150 includes the hub sleeve 152, the dog ring 154 disposed radially outside the hub sleeve 152, and dog teeth 160 provided in first and second input gears 156, 158. Although not being shown in FIG. 6, the dog teeth 160 provided in the second input gear 158 are substantially the same as the dog teeth 160 provided in the first input gear 156 as shown in FIG. 6.

The hub sleeve 152 is a cylindrical tubular member, and is fitted on the input shaft (not shown) unrotatably relative to the input shaft. The hub sleeve 152 has an outer circumferential surface in which a plurality of fitting grooves 162 extending in parallel to the axis C1 are provided.

The dog ring 154 is disposed between the first and second input gears 156, 158 in the direction of the axis C1 of the input shaft (not shown). The dog ring 154 is an annular member, and has a plurality of radially inward protrusions 164 provided in its inner circumferential portion. The radially inward protrusions 164 are formed integrally with dog teeth 166, 168 that are described below. The inward protrusions 164 are fitted in the respective fitting grooves 162, so that the dog ring 154 is unrotatable and movable in the direction of the axis C1, relative to the hub sleeve 152 (i.e., relative to the input shaft). The dog ring 154 is to be moved, by a shift fork (not shown), in the direction of the axis C.

The dog ring 154 of the present embodiment is constituted by a single member. The dog ring 154 is provided, on a first-side face thereof opposed to the first input gear 156 in the direction of axis C1, with the dog teeth 166 that are equi-angularly spaced apart from one another in the circumferential direction. The number of the dog teeth 166 is equal to that of the dog teeth 160. The dog teeth 166 are located in respective positons, which enable the dog teeth 166 to mesh with the dog teeth 160 of the first input gear 156 when the dog ring 154 is moved toward the first input gear 156. The dog ring 154 is provided, on a second-side face thereof opposed to the second input gear 158 in the direction of axis C1, with the dog teeth 168 that are equi-angularly spaced apart from one another in the circumferential direction. The number of the dog teeth 168 is equal to that of the dog teeth 160. The dog teeth 168 are located in respective positons, which enable the dog teeth 168 to mesh with the dog teeth 160 of the second input gear 158 when the dog ring 154 is moved toward the second input gear 158. The dog teeth 166, 168 are formed integrally with the dog ring 154.

Also in a case where the dog clutch 150 constructed as described above is used in place of the dog clutch 32 or dog clutch 114 of the above-described embodiments, it is possible to obtain substantially the same advantages as in the above-described embodiments. Further, in the dog clutch 150 of the present embodiment, the number of the hub sleeve 152 and the number of the dog ring 154 are only one so that an increase of number of components is avoided.

Embodiment 4

Figure 7:
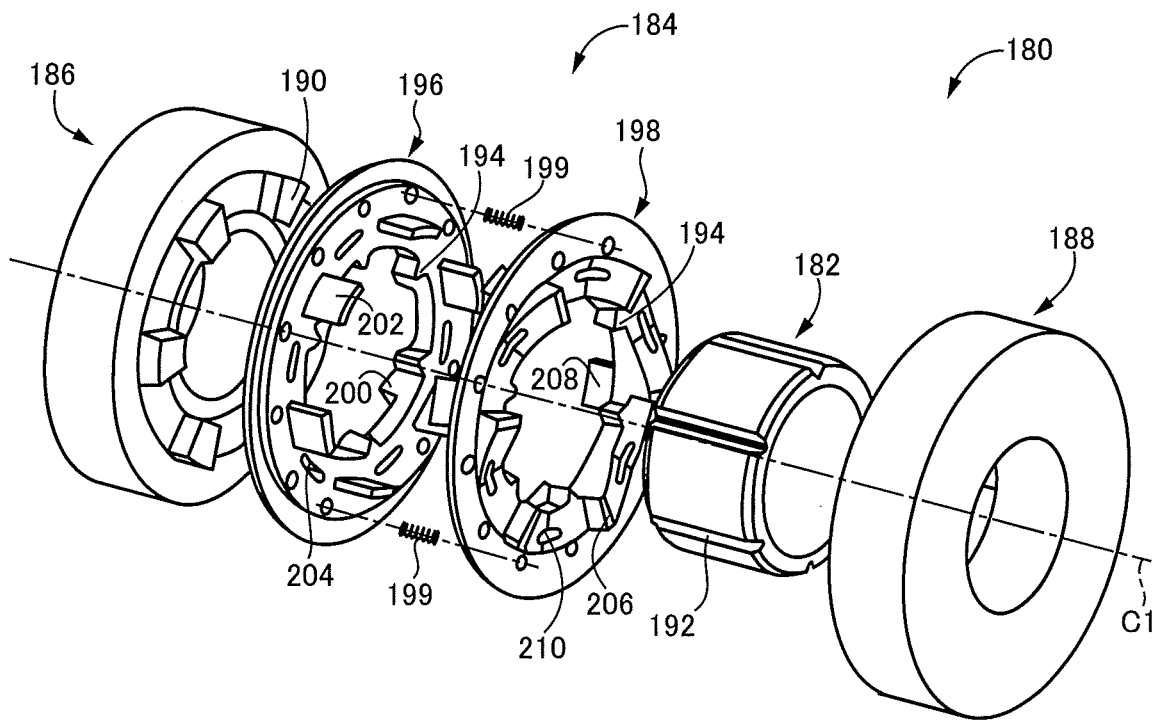
FIG. 7 is an exploded perspective view of a dog clutch according to further embodiment of the invention.

FIG. 7 is an exploded perspective view of a dog clutch 180 according to still another embodiment of the invention. This dog clutch 180 is used in place of, for example, the dog clutch 32 (used in the transmission 10) or the dog clutch 114 (used in the transmission 100). The dog clutch 180 is constituted principally by a single hub sleeve 182 and a dog ring 184, wherein the dog ring 184 is constituted by two members, i.e., a first annular member 196 and a second annular member 198.

The dog clutch 180 includes the hub sleeve 182, the dog ring 184 disposed radially outside the hub sleeve 182, and dog teeth 190 provided in first and second input gears 186, 188. Although not being shown in FIG. 7, the dog teeth 190 provided in the second input gear 188 are substantially the same as the dog teeth 190 provided in the first input gear 186 as shown in FIG. 7.

The hub sleeve 182 is a cylindrical tubular member, and is fitted on the input shaft (not shown) unrotatably relative to the input shaft. The hub sleeve 182 has an outer circumferential surface in which a plurality of fitting grooves 192 extending in parallel to the axis C1 are provided.

The dog ring 184 is an annular member, and has a plurality of radially inward protrusions 194 provided in its inner circumferential portion. The inward protrusions 194 are fitted in the respective fitting grooves 192, such that the dog ring 184 is unrotatable and movable in the direction of the axis C1, relative to the hub sleeve 182.

The dog ring 184 is constituted by the first and second annular members 196, 198 that are connected to each other via a spring 199. The inward protrusions 194 are provided in the first and second annular members 196, 198, and each of the protrusions 194 provided in the first annular member 196 and a corresponding one of the protrusions 194 provided in the second annular member 198 are positioned in the same phase when the first and second annular members 196, 198 are connected to each other.

The first annular member 196 is located to be adjacent to the first input gear 186 in the direction of the axis C1 while the second annular member 198 is located to be adjacent to the second input gear 188 in the direction of the axis C1.

The first annular member 196 is an annular member, and has a plurality of first dog teeth 200 which are provided in its face opposed to the first input gear 186 in the direction of the axis C1 and which protrude from the opposed face toward the first input gear 186. The first annular member 196 has also a plurality of second dog teeth 202 which are provided in its another face opposed to the second annular member 198 in the direction of the axis C1 and which protrude from the other face toward the second annular member 198. The first annular member 196 further has a plurality of through-holes 204, such that fourth dog teeth 208 (that are described below) of the second annular member 198 extend through the respective through-holes 204 after the first and second annular members 196, 198 are assembled to each other. The number of the through-holes 204 is equal to that of the fourth dog teeth 208.

The second annular member 198 is an annular member, and has a plurality of third dog teeth 206 which are provided in its face opposed to the second input gear 188 in the direction of the axis C1 and which protrude from the opposed face toward the second input gear 188. The second annular member 198 has also the plurality of fourth dog teeth 208 which are provided in its another face opposed to the first annular member 196 in the direction of the axis C1 and which protrude from the other face toward the first annular member 196. The second annular member 198 further has a plurality of through-holes 210, such that the second dog teeth 202 of the first annular member 196 extend through the respective through-holes 210 after the first and second annular members 196, 198 are assembled to each other. The number of the through-holes 210 is equal to that of the second dog teeth 202.

With the first and second annular members 196, 198 being assembled to each other, the second dog teeth 202 of the first annular member 196 extend through the respective through-holes 210 of the second annular member 198 while the fourth dog teeth 208 of the second annular member 198 extend through the respective through-holes 204 of the first annular member 196. Thus, the fourth dog teeth 208 as well as the first dog teeth 200 protrude toward the first input gear 186. The number of the first dog teeth 200 and the number of the fourth dog teeth 208 are equal to each other, and each one of the first dog teeth 200 is located to be adjacent to a corresponding one of the fourth dog teeth 208 in the circumferential direction when the first and second annular members 196, 198 are assembled to each other. The first and fourth dog teeth 200, 208 are located in respective positons, which enable the dog teeth 200, 208 to mesh with the dog teeth 190 of the first input gear 186 when the dog ring 184 (first annular member 196) is moved toward the first input gear 186 in the direction of the axis C1. Meanwhile, the third dog teeth 206 and the second dog teeth 202 protrude toward the second input gear 188. The number of the third dog teeth 206 and the number of the second dog teeth 202 are equal to each other, and each one of the third dog teeth 206 is located to be adjacent to a corresponding one of the second dog teeth 202 in the circumferential direction when the first and second annular members 196, 198 are assembled to each other. The second and third dog teeth 202, 206 are located in respective positons, which enable the dog teeth 202, 206 to mesh with the dog teeth 190 of the second input gear 188 when the dog ring 184 (second annular member 198) is moved toward the second input gear 188 in the direction of the axis C1.

Also in a case where the dog clutch 180 constructed as described above is used in place of the dog clutch 32 or dog clutch 114 of the above-described embodiments, it is possible to obtain substantially the same advantages as in the above-described embodiments. Further, the dog clutch 180 is constituted by the single hub sleeve 182 and the single dog ring 184, so that an increase of number of components is avoided. Since the dog clutch 180 is operated in a manner not basically different from the above-described dog clutch 32, the detailed description will not be provided.

While the embodiments of the present invention have been described above in detail by reference to the accompanying drawings, it is to be understood that the present invention may be embodied otherwise.

For example, the transmission 10 of the Embodiment 1 is a multi-step shift transmission having eight forward-drive gear positions, and the transmission 100 of the Embodiment 2 is a multi-step shift transmission having six forward-drive gear positions. However, the number of the available gear positions is not particularly limited. Even where the number of the gear positions is changed, it is possible to obtain the same advantages as in the above-described embodiments, because the number of the dog clutch is not increased depending on change of the number of the gear positions.

In the Embodiment 1, the 1st drive gear 68a and 2nd drive gear 62a mesh with the same driven gear 70a, the 3rd drive gear 68b and 4th drive gear 62b mesh with the same driven gear 70b, the 5th drive gear 68c and 6th drive gear 62c mesh with the same driven gear 70c, and the 7th drive gear 68d and 8th drive gear 62d mesh with the same driven gear 70d. However, the drive gears may be arranged to mesh with respective driven gears that are different from each other.

In the transmission 10 of the Embodiment 1, the radial distance between the axis C1 and the axis C2 and the radial distance between the axis C1 and the axis C3 are equal to each other. However, the radial distances may be different from each other.

In the Embodiments 1, 2 and 4, each of the first annular member 36a, 40a, 196 and a corresponding one of the second annular members 36b, 40b, 198 are connected to each other via a corresponding one of the springs 55, 59, 199, which is interposed therebetween. However, each of the springs 55, 59, 199 may be replaced with any other elastic member such as a rubber.

In the Embodiment 1, each of the first dog ring 36 and second dog ring 40 is constituted by a corresponding one of the first annular members 36a, 40a and a corresponding one of the second annular member 36b, 40b. However, each of the first dog ring 36 and second dog ring 40 may be constituted by a single member.

While the embodiments of the present invention haves been described above for illustrative purpose only, it is to be understood that the present invention may be embodied with various changes and improvements, which may occur to those skilled in the art.

What is claimed is:

1. A vehicle transmission having a plurality of gear positions that are to be selectively established, said vehicle transmission comprising:
  an input shaft to which a power is to be transmitted from an engine;
  a plurality of intermediate shafts including a first shaft and a second shaft such that the power is to be transmitted from said input shaft to a selected one of said first and second shafts;
  an output shaft to which the power is to be transmitted from said input shaft via said selected one of said first and second shafts;
  at least one first drive gear which is disposed on said first shaft;
  at least one second drive gear which is disposed on said second shaft;
  at least one driven gear which is disposed on said output shaft;
  a dog clutch which is disposed on said input shaft, and which is configured to selectively connect and disconnect between said input shaft and said first shaft and selectively connect and disconnect between said input shaft and said second shaft; and
  a synchronous meshing apparatus including: a first synchronous meshing device and a second synchronous meshing device, wherein
  said first synchronous meshing device is configured to selectively connect and disconnect between said first shaft and said output shaft, and is configured, when connecting between said first shaft and said output shaft, to establish a power transmission path from said first shaft to said output shaft via a selected one of said at least one first drive gear and a corresponding one of said at least one driven gear which meshes with said selected one of said at least one first drive gear, said second synchronous meshing device is configured to selectively connect and disconnect between said second shaft and said output shaft, and is configured, when connecting between said second shaft and said output shaft, to establish a power transmission path from said second shaft to said output shaft via a selected one of said at least one second drive gear and a corresponding one of said at least one driven gear which meshes with said selected one of said at least one second drive gear, said dog clutch includes a first dog ring disposed to be adjacent to said first input gear in an axial direction of said input shaft a second dog ring disposed to be adjacent to said second input gear in the axial direction of said input shaft, and each of said first and second dog rings of said dog clutch includes a first annular member and a second annular member that are connected to each other via an elastic member.

2. The vehicle transmission according to claim 1, wherein said at least one first drive gear, which is disposed on said first shaft, is rotatable relative to said first shaft, said at least one second drive gear, which is disposed on said second shaft, is rotatable relative to said second shaft, said at least one driven gear, which is disposed on said output shaft, is unrotatable relative to said output shaft, said first synchronous meshing device is configured to establish the power transmission path from said first shaft to said output shaft via said selected one of said at least one first drive gear and said corresponding one of said at least one driven gear, by restricting rotation of said selected one of said at least one first drive gear relative to said first shaft, and said second synchronous meshing device is configured to establish the power transmission path from said second shaft to said output shaft via said selected one of said at least one second drive gear and said corresponding one of said at least one driven gear, by restricting rotation of said selected one of said at least one second drive gear relative to said second shaft.

3. The vehicle transmission according to claim 2, wherein said plurality of gear positions include at least one even-numbered gear position and at least one odd-numbered gear position, said at least one first drive gear, which is disposed on said first shaft rotatably relative to said first shaft, is at least one even-numbered-gear-position-establishing drive gear, such that, when each of said at least one even-numbered gear position is established, the power is transmittable through a corresponding one of said at least one even-numbered-gear-position-establishing drive gear, said at least one second drive gear, which is disposed on said second shaft rotatably relative to said second shaft, is at least one odd-numbered-gear-position-establishing drive gear, such that, when each of said at least one odd-numbered gear position is established, the power is transmittable through a corresponding one of said at least one odd-numbered-gear-position-establishing drive gear, said first synchronous meshing device includes at least one first synchronous clutch, each of said at least one first synchronous clutch being disposed to be adjacent to a corresponding one of said at least one even-numbered-gear-position-establishing drive gear in an axial direction of said first shaft, and being configured, when a corresponding one of said at least one even-numbered gear position is to be established, to restrict rotation of said corresponding one of said at least one even-numbered-gear-position-establishing drive gear relative to said first shaft, and said second synchronous meshing device includes at least one second synchronous clutch, each of said at least one second synchronous clutch being disposed to be adjacent to a corresponding one of said at least one odd-numbered-gear-position-establishing drive gear in an axial direction of said second shaft, and being configured, when a corresponding one of said at least one odd-numbered gear position is to be established, to restrict rotation of said corresponding one of said at least one odd-numbered-gear-position-establishing drive gear relative to said second shaft.

4. The vehicle transmission according to claim 2, wherein said at least one first drive gear, which is disposed on said first shaft rotatably relative to said first shaft, consists of a plurality of first drive gears, said at least one second drive gear, which is disposed on said second shaft rotatably relative to said second shaft, consists of a plurality of second drive gears, said at least one driven gear, which is disposed on said output shaft unrotatably relative to said output shaft, consists of a plurality of driven gears meshing with said plurality of first drive gears and said plurality of second drive gears, in case of selection of one of the plurality of gear positions in which the power is to be transmitted from said input shaft to said output shaft via one of said plurality of first drive gears and a corresponding one of said plurality of driven gears which meshes with said one of said plurality of first drive gears, said dog clutch is configured to connect between said input shaft and said first shaft, and said first synchronous meshing device is configured to restrict rotation of said one of said plurality of first drive gears relative to said first shaft, and in case of selection of one of the plurality of gear positions in which the power is to be transmitted from said input shaft to said output shaft via one of said plurality of second drive gears and a corresponding one of said plurality of driven gears which meshes with said one of said plurality of second drive gears, said dog clutch is configured to connect between said input shaft and said second shaft, and said second synchronous meshing device is configured to restrict rotation of said one of said plurality of second drive gears relative to said second shaft.

5. The vehicle transmission according to claim 1, wherein said at least one first drive gear, which is disposed on said first shaft, is unrotatable relative to said first shaft, said at least one second drive gear, which is disposed on said second shaft, is unrotatable relative to said second shaft, said at least one driven gear, which is disposed on said output shaft, is rotatable relative to said output shaft, and consists of at least one first driven gear and at least one second driven gear, said at least one first driven gear meshing with said at least one first drive gear, said at least one second driven gear meshing with said at least one second drive gear, said first synchronous meshing device is configured to establish the power transmission path from said first shaft to said output shaft via said selected one of said at least one first drive gear and a corresponding one of said at least one first driven gear which meshes with said selected one of said at least one first drive gear, by restricting rotation of said corresponding one of said at least one first driven gear relative to said output shaft, and said second synchronous meshing device is configured to establish the power transmission path from said second shaft to said output shaft via said selected one of said at least one second drive gear and a corresponding one of said at least one second driven gear which meshes with said selected one of said at least one second drive gear, by restricting rotation of said corresponding one of said at least one second driven gear relative to said output shaft.

6. The vehicle transmission according to claim 5, wherein said plurality of gear positions include at least one even-numbered gear position and at least one odd-numbered gear position, said at least one first drive gear, which is disposed on said first shaft unrotatably relative to said first shaft, is at least one even-numbered-gear-position-establishing drive gear, such that, when each of said at least one even-numbered gear position is established, the power is transmittable through a corresponding one of said at least one even-numbered-gear-position-establishing drive gear, said at least one second drive gear, which is disposed on said second shaft unrotatably relative to said second shaft, is at least one odd-numbered-gear-position-establishing drive gear, such that, when each of said at least one odd-numbered gear position is established, the power is transmittable through a corresponding one of said at least one odd-numbered-gear-position-establishing drive gear, said first synchronous meshing device includes at least one first synchronous clutch, each of said at least one first synchronous clutch being disposed to be adjacent to a corresponding one of said at least one first driven gear in an axial direction of said output shaft, and being configured, when a corresponding one of said at least one even-numbered gear position is to be established, to restrict rotation of said corresponding one of said at least one first driven gear relative to said output shaft, and said second synchronous meshing device includes at least one second synchronous clutch, each of said at least one second synchronous clutch being disposed to be adjacent to a corresponding one of said at least one second driven gear in the axial direction of said output shaft, and being configured, when a corresponding one of said at least one odd-numbered gear position is to be established, to restrict rotation of said corresponding one of said at least one second driven gear relative to said output shaft.

7. The vehicle transmission according to claim 5, wherein said at least one first drive gear, which is disposed on said first shaft unrotatably relative to said first shaft, consists of a plurality of first drive gears, said at least one second drive gear, which is disposed on said second shaft unrotatably relative to said second shaft, consist of a plurality of second drive gears, said at least one driven gear, which is disposed on said output shaft rotatably relative to said output shaft, consists of a plurality of first driven gears and a plurality of second driven gears, said plurality of first driven gears meshing with said plurality of first drive gears, said plurality of second driven gears meshing with said plurality of second drive gears, in case of selection of one of the plurality of gear positions in which the power is to be transmitted from said input shaft to said output shaft via one of said plurality of first driven gears and a corresponding one of said plurality of first drive gears which meshes with said one of said plurality of first driven gears, said dog clutch is configured to connect between said input shaft and said first shaft, and said first synchronous meshing device is configured to restrict rotation of said one of said plurality of first driven gears relative to said output shaft, and in case of selection of one of the plurality of gear positions in which the power is to be transmitted from said input shaft to said output shaft via one of said plurality of second driven gears and a corresponding one of said plurality of second drive gears which meshes with said one of said plurality of second driven gears, said dog clutch is configured to connect between said input shaft and said second shaft, and said second synchronous meshing device is configured to restrict rotation of said one of said plurality of second driven gears relative to said output shaft.

8. The vehicle transmission according to claim 1, comprising:

a first input gear and a second input gear which are disposed on said input shaft and which are rotatable relative to said input shaft; and a first output gear and a second output gear which are fixed on said first shaft and said second shaft, respectively, and which mesh with said first input gear and said second input gear, respectively, wherein said dog clutch is configured to selectively connect and disconnect between said input shaft and said first input gear and selectively connect and disconnect between said input shaft and said second input gear.

9. The vehicle transmission according to claim 8, wherein dog teeth are provided in said first input gear; and dog teeth are provided in said second input gear, said first dog ring is provided with dog teeth that are to mesh with said dog teeth of said first input gear, said second dog ring is provided with dog teeth that are to mesh with said dog teeth of said second input gear, and said first dog ring and said second dog ring are unrotatable relative to said input shaft, and are movable relative to said input shaft in the axial direction of said input shaft.

10. The vehicle transmission according to claim 9, wherein said first annular member of said first dog ring is disposed to be adjacent to said first input gear in the axial direction of said input shaft, while said second annular member of said first dog ring is disposed on a side of said first annular member of said first dog ring, which is remote from said first input gear, in the axial direction of said input shaft, said dog teeth of said first dog ring include first dog teeth which are provided in said first annular member of said first dog ring, and which are to mesh with said dog teeth of said first input gear;

said dog teeth of said first dog ring include, in addition to said first dog teeth, second dog teeth which are provided in said second annular member of said first dog ring, and which extend through respective through-holes provided in said first annular member of said first dog ring so as to mesh with said dog teeth of said first input gear;

said first annular member of said second dog ring is disposed to be adjacent to said second input gear in the axial direction of said input shaft, while said second annular member of said second dog ring is disposed on a side of said first annular member of said second dog ring, which is remote from said second input gear, in the axial direction of said input shaft, said dog teeth of said second dog ring include first dog teeth which are provided in said first annular member of said second dog ring, and which are to mesh with said dog teeth of said second input gear; and said dog teeth of said second dog ring include, in addition to said first dog teeth, second dog teeth which are provided in said second annular member of said second dog ring, and which extend through respective through-holes provided in said first annular member of said second dog ring so as to mesh with said dog teeth of said second input gear.

11. The vehicle transmission according to claim 1, wherein said first shaft, said second shaft and said output shaft extend along respective axes different from one another, said at least one first drive gear disposed on said first shaft, said at least second drive gear and said at least one driven gear disposed on said output shaft overlap with one another as viewed in a radial direction of said output shaft, and said plurality of driven gears disposed on said output shaft mesh with said at least one first drive gear disposed on said first shaft and said at least second drive gear disposed on said second shaft.

12. The vehicle transmission according to claim 1, wherein said first shaft and said second shaft are coaxial with each other, and overlap with each other as viewed in a radial direction of said output shaft, said output shaft extends along an axis that is different from an axis of said first shaft and said second shaft, said at least one first drive gear disposed on said first shaft and said at least one second drive gear disposed on said second shaft are located in respective positions different from each other in a direction of the axis of said first and second shafts, and said at least one driven gear disposed on said output shaft consists of at least one first driven gear meshing with said at least one first drive gear and at least one second driven gear meshing with said at least one second drive gear.

13. The vehicle transmission according to claim 1, wherein said plurality of gear positions include a plurality of even-numbered gear positions and a plurality of odd-numbered gear positions, said at least one first drive gear, which is disposed on said first shaft, consists of a plurality of even-numbered-gear-position-establishing drive gears, such that, when each of said even-numbered gear positions is established, the power is transmittable through a corresponding one of said even-numbered-gear-position-establishing drive gears, said at least one second drive gear, which is disposed on said second shaft, consists of a plurality of odd-numbered-gear-position-establishing drive gears, such that, when each of said odd-numbered gear positions is established, the power is transmittable through a corresponding one of said odd-numbered-gear-position-establishing drive gears, when said first synchronous meshing device establishes the power transmission path from said first shaft to said output shaft for establishing a selected one of the even-numbered gear positions, with said dog clutch connecting between said input shaft and said first shaft and disconnecting between said input shaft and said second shaft, said second synchronous meshing device is configured to establish the power transmission path from said second shaft to said output shaft via one of said odd-numbered-gear-position-establishing drive gears which is selected for establishing one of the odd-numbered gear positions that is close to said selected one of the even-numbered gear positions in speed ratio, and when said second synchronous meshing device establishes the power transmission path from said second shaft to said output shaft for establishing a selected one of the odd-numbered gear positions, with said dog clutch connecting between said input shaft and said second shaft and disconnecting between said input shaft and said first shaft, said first synchronous meshing device is configured to establish the power transmission path from said first shaft to said output shaft via one of said even-numbered-gear-position-establishing drive gears which is selected for establishing one of the even-numbered gear positions close to said selected one of the odd-numbered gear positions in speed ratio.

14. A vehicle transmission having a plurality of gear positions that are to be selectively established, said vehicle transmission comprising:

an input shaft to which a power is to be transmitted from an engine;

a plurality of intermediate shafts including a first shaft and a second shaft such that the power is to be transmitted from said input shaft to a selected one of said first and second shafts;

an output shaft to which the power is to be transmitted from said input shaft via said selected one of said first and second shafts;

at least one first drive gear which is disposed on said first shaft;

at least one second drive gear which is disposed on said second shaft;

at least one driven gear which is disposed on said output shaft;

a dog clutch which is disposed on said input shaft, and which is configured to selectively connect and disconnect between said input shaft and said first shaft and selectively connect and disconnect between said input shaft and said second shaft; and a synchronous meshing apparatus including: a first synchronous meshing device and a second synchronous meshing device, wherein said first synchronous meshing device is configured to selectively connect and disconnect between said first shaft and said output shaft, and is configured, when connecting between said first shaft and said output shaft, to establish a power transmission path from said first shaft to said output shaft via a selected one of said at least one first drive gear and a corresponding one of said at least one driven gear which meshes with said selected one of said at least one first drive gear, said second synchronous meshing device is configured to selectively connect and disconnect between said second shaft and said output shaft, and is configured, when connecting between said second shaft and said output shaft, to establish a power transmission path from said second shaft to said output shaft via a selected one of said at least one second drive gear and a corresponding one of said at least one driven gear which meshes with said selected one of said at least one second drive gear, said dog clutch includes a dog ring disposed between said first input gear and said second input gear in an axial direction of said input shaft dog teeth provided in said first input gear; and dog teeth provided in said second input gear, said dog ring is provided, on a first-side face thereof opposed to said first input gear in the axial direction of said input shaft, with dog teeth that are to mesh with said dog teeth of said first input gear, said dog ring is provided, on a second-side face thereof opposed to said second input gear in the axial direction of said input shaft, with dog teeth that are to mesh with said dog teeth of said second input gear, said dog ring is unrotatable relative to said input shaft, and is movable relative to said input shaft in the axial direction of said input shaft, said dog ring includes a first annular member and a second annular member that are connected to each other via an elastic member, said first annular member is disposed on a side of said first input gear in the axial direction of said input shaft, while said second annular member is disposed on a side of said second input gear in the axial direction of said input shaft, said dog teeth provided on said first-side face of said dog ring include: first dog teeth which are provided on said first annular member; and fourth dog teeth which are provided on said second annular member, said dog teeth provided on said second-side face of said dog ring include: second dog teeth which are provided on said first annular member; and third dog teeth which are provided on said second annular member, said second dog teeth extend through respective through-holes provided in said second annular member so as to mesh with said dog teeth of said second input gear, and said fourth dog teeth extend through respective through-holes provided in said first annular member so as to mesh with said dog teeth of said first input gear.

* * * * *